United States Patent
Seo et al.

(10) Patent No.: US 12,439,335 B2
(45) Date of Patent: Oct. 7, 2025

(54) WAKE UP SIGNAL CONFIGURATION

(71) Applicant: LG ELECTRONICS INC., Seoul (KR)

(72) Inventors: Inkwon Seo, Seoul (KR); Joonkui Ahn, Seoul (KR); Changhwan Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 657 days.

(21) Appl. No.: 17/753,014

(22) PCT Filed: Aug. 12, 2020

(86) PCT No.: PCT/KR2020/010665
§ 371 (c)(1),
(2) Date: Feb. 15, 2022

(87) PCT Pub. No.: WO2021/029664
PCT Pub. Date: Feb. 18, 2021

(65) Prior Publication Data
US 2022/0338119 A1   Oct. 20, 2022

Related U.S. Application Data

(60) Provisional application No. 62/887,634, filed on Aug. 15, 2019.

(30) Foreign Application Priority Data

Nov. 15, 2019 (KR) .......................... 10-2019-0146992

(51) Int. Cl.
*H04W 52/02* (2009.01)
*H04W 24/10* (2009.01)
(Continued)

(52) U.S. Cl.
CPC ....... *H04W 52/0229* (2013.01); *H04W 24/10* (2013.01); *H04W 72/044* (2013.01); *H04W 72/23* (2023.01)

(58) Field of Classification Search
CPC ............. H04W 52/0229; H04W 24/10; H04W 72/044; H04W 72/23; H04W 48/12;
(Continued)

(56) References Cited

U.S. PATENT DOCUMENTS 10,880,895 B2 *  12/2020  Gordaychik ........ H04W 72/044
12,207,253 B2 *   1/2025  Matsumura ........... H04L 5/0023
(Continued)

OTHER PUBLICATIONS

PCT International Application No. PCT/KR2020/010665, International Search Report dated Nov. 18, 2020, 4 pages.
(Continued)

*Primary Examiner* — John D Blanton
(74) *Attorney, Agent, or Firm* — LEE, HONG, DEGERMAN, KANG & WAIMEY

(57) ABSTRACT

Presented are a method and a device for receiving wake up-downlink control information (DCI), which are characterized in that in a method for transmitting and receiving a signal in a wireless communication system, a terminal receives DCI configuration information related to a power saving scheme and receives, from a network, DCI including a first field and a second field on the basis of the DCI configuration information, wherein: the first field is an area to which information about the terminal is allocated, and the DCI configuration information notifies of the size of the DCI, the start position of the first field in the DCI, and a bit stream for the second field.

15 Claims, 33 Drawing Sheets

(51) Int. Cl.
*H04W 72/044* (2023.01)
*H04W 72/23* (2023.01)

(58) Field of Classification Search
CPC ........ H04W 52/02; H04W 76/28; H04L 5/00; Y02D 30/70
See application file for complete search history.

(56) References Cited

U.S. PATENT DOCUMENTS

| | | | |
|---|---|---|---|
| 2016/0295637 A1* | 10/2016 | Bergquist | H04W 24/08 |
| 2018/0006863 A1* | 1/2018 | Li | H04L 27/2646 |
| 2019/0090299 A1 | 3/2019 | Ang et al. | |
| 2020/0007296 A1* | 1/2020 | Papasakellariou | H04L 1/1861 |
| 2020/0092814 A1* | 3/2020 | Zhou | H04W 52/0235 |
| 2020/0153581 A1* | 5/2020 | Tsai | H04W 24/10 |
| 2020/0337110 A1* | 10/2020 | Kim | H04W 76/28 |
| 2020/0395988 A1* | 12/2020 | Lee | H04L 5/0087 |
| 2021/0051759 A1* | 2/2021 | Zhou | H04W 52/0235 |
| 2021/0204216 A1* | 7/2021 | Yang | H04W 52/0274 |
| 2021/0307031 A1* | 9/2021 | Chen | H04W 72/1263 |
| 2021/0336688 A1* | 10/2021 | Lee | H04W 4/40 |
| 2022/0240187 A1* | 7/2022 | Guo | H04W 76/30 |
| 2022/0303899 A1* | 9/2022 | Ma | H04W 24/08 |
| 2022/0338119 A1* | 10/2022 | Seo | H04W 72/044 |
| 2022/0373634 A1* | 11/2022 | Manolakos | H04L 5/0051 |
| 2022/0394616 A1* | 12/2022 | Maleki | H04W 52/0216 |

OTHER PUBLICATIONS

Vivo, "PDCCH-based power saving signal/channel," R1-1906170, 3GPP TSG RAN WG1 #97, May 2019, 12 pages.

CATT, "PDCCH-Based Power Saving Signal/Channel Design," R1-1906350, 3GPP TSG RAN WG1 Meeting #97, May 2019, 16 pages.

Intel Corporation, "Considerations on PDCCH-based power saving signal," R1-1906819, 3GPP TSG-RAN WG1 #97, May 2019, 12 pages.

* cited by examiner

WAKE UP SIGNAL CONFIGURATION

CROSS-REFERENCE TO RELATED APPLICATIONS

This application is the National Stage filing under 35 U.S.C. 371 of International Application No. PCT/KR2020/010665, filed on Aug. 12, 2020, which claims the benefit of earlier filing date and right of priority to Korean Application No. 10-2019-0146992 filed on Nov. 15, 2019, and also claims the benefit of U.S. Provisional Application No. 62/887,634, filed on Aug. 15, 2019, the contents of all of which are hereby incorporated by reference herein in their entireties.

BACKGROUND OF THE DISCLOSURE

Field of the Disclosure

The present disclosure relates to wireless communication.

Related Art

As more and more communication devices require more communication capacity, there is a need for improved mobile broadband communication over existing radio access technology. Also, massive machine type communications (MTC), which provides various services by connecting many devices and objects, is one of the major issues to be considered in the next generation communication. In addition, communication system design considering reliability/latency sensitive service/UE is being discussed. The introduction of next generation radio access technology considering enhanced mobile broadband communication (eMBB), massive MTC (mMTC), ultrareliable and low latency communication (URLLC) is discussed. This new technology may be called new radio access technology (new RAT or NR) in the present disclosure for convenience.

Currently, in NR, a wake up signal (WUS) is considered for power saving of the terminal. In addition, the wake up signal may be defined in a manner of indicating whether to perform PDCCH monitoring in a DRX on-duration period or on-duration in connection with a DRX operation. New DCI for the wake up signal is considered, and a channel configuration for smoothly performing a wake-up signal operation through the new DCI is required. In the present disclosure, the new DCI may be referred to as WUS DCI or wake up-DCI.

SUMMARY

The present disclosure proposes a method and an apparatus for receiving wake up-DCI.

Advantageous Effects

According to the present disclosure, an efficient method of receiving wake up-DCI for receiving a wake up signal is provided, and a power saving efficiency of the terminal can be improved.

The effects that can be obtained through specific examples of the present disclosure are not limited to the effects listed above. For example, there may be various technical effects that a person having ordinary skill in the related art can understand or derive from the present disclosure. Accordingly, specific effects of the present disclosure are not limited to those explicitly described in the present disclosure and may include various effects that can be understood or derived from the technical features of the present disclosure.

DESCRIPTION OF EXEMPLARY EMBODIMENTS

Figure 1:
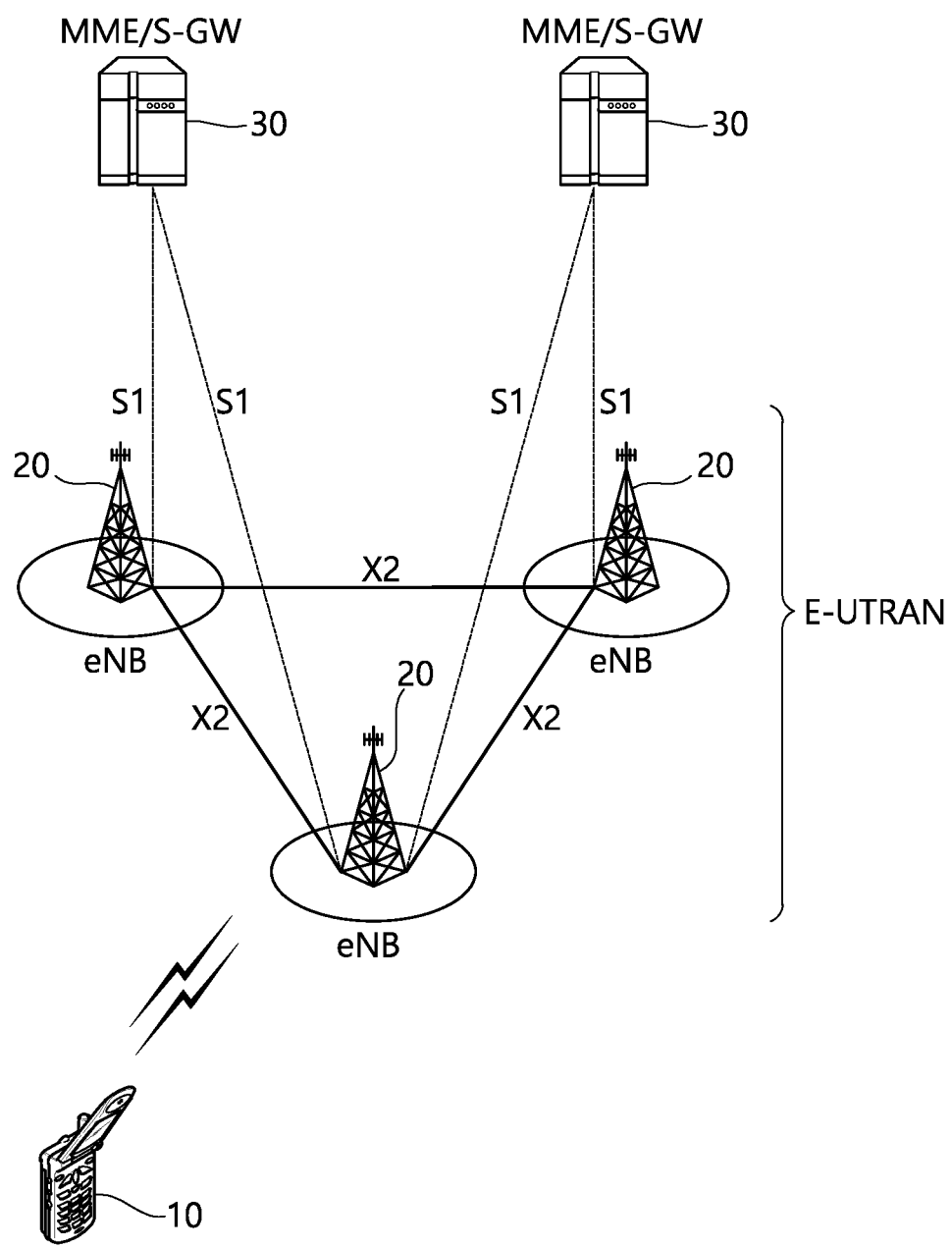
FIG. 1 shows a wireless communication system to which the present disclosure may be applied.

As used herein, "A or B" may mean "only A", "only B", or "both A and B". That is, "A or B" may be interpreted as "A and/or B" herein. For example, "A, B or C" may mean "only A", "only B", "only C", or "any combination of A, B, and C".

As used herein, a slash (/) or a comma (,) may mean "and/or". For example, "A/B" may mean "A and/or B". Therefore, "A/B" may include "only A", "only B", or "both A and B". For example, "A, B, C" may mean "A, B, or C".

As used herein, "at least one of A and B" may mean "only A", "only B", or "both A and B". Further, as used herein, "at least one of A or B" or "at least one of A and/or B" may be interpreted equally as "at least one of A and B".

As used herein, "at least one of A, B, and C" may mean "only A", "only B", "only C", or "any combination of A, B, and C". Further, "at least one of A, B, or C" or "at least one of A, B, and/or C" may mean "at least one of A, B, and C".

As used herein, parentheses may mean "for example". For instance, the expression "control information (PDCCH)" may mean that a PDCCH is proposed as an example of control information. That is, control information is not limited to a PDCCH, but a PDCCH is proposed as an example of control information. Further, the expression "control information (i.e., a PDCCH)" may also mean that a PDCCH is proposed as an example of control information.

The following technologies can be used in various wireless communication systems such as CDMA (code division multiple access), FDMA (frequency division multiple access), TDMA (time division multiple access), OFDMA (orthogonal frequency division multiple access), SC-FDMA (single carrier frequency division multiple access). CDMA may be implemented with a radio technology such as UTRA (universal terrestrial radio access) or CDMA2000. TDMA may be implemented with radio technology such as GSM (global system for mobile communications)/GPRS (general packet radio service)/EDGE (enhanced data rates for GSM evolution). OFDMA may be implemented with a wireless technology such as IEEE (institute of electrical and electronics engineers) 802.11 (Wi-Fi), IEEE 802.16 (WiMAX), IEEE 802-20, E-UTRA (evolved UTRA), and the like. IEEE 802.16m is an evolution of IEEE 802.16e, and provides backward compatibility with a system based on IEEE 802.16e. UTRA is a part of UMTS (universal mobile telecommunications system). 3GPP (3rd generation partnership project) LTE (long term evolution) is a part of E-UMTS (evolved UMTS) that uses E-UTRA (evolved-UMTS terrestrial radio access), and employs OFDMA in the downlink and SC-FDMA in the uplink. LTE-A (advanced) is an evolution of 3GPP LTE.

5G NR is the successor technology of LTE-A, and is a new Clean-slate mobile communication system with characteristics such as high performance, low latency, and high availability. 5G NR can utilize all available spectrum resources, from low frequency bands below 1 GHz to intermediate frequency bands from 1 GHz to 10 GHz and high frequency (millimeter wave) bands above 24 GHz, and the like.

For clarity of explanation, LTE-A or 5G NR is mainly described, but the technical spirit of the present disclosure is not limited thereto.

FIG. 1 shows a wireless communication system to which the present disclosure may be applied. The wireless communication system may be referred to as an Evolved-UMTS Terrestrial Radio Access Network (E-UTRAN) or a Long Term Evolution (LTE)/LTE-A system.

The E-UTRAN includes at least one base station (BS) 20 which provides a control plane and a user plane to a user equipment (UE) 10. The UE 10 may be fixed or mobile, and may be referred to as another terminology, such as a mobile station (MS), a user terminal (UT), a subscriber station (SS), a mobile terminal (MT), a wireless device, etc. The BS 20 is generally a fixed station that communicates with the UE 10 and may be referred to as another terminology, such as an evolved node-B (eNB), a base transceiver system (BTS), an access point, etc.

The BSs 20 are interconnected by means of an X2 interface. The BSs 20 are also connected by means of an S1 interface to an evolved packet core (EPC) 30, more specifically, to a mobility management entity (MME) through S1-MME and to a serving gateway (S-GW) through S1-U.

The EPC 30 includes an MME, an S-GW, and a packet data network-gateway (P-GW). The MME has access information of the UE or capability information of the UE, and such information is generally used for mobility management of the UE. The S-GW is a gateway having an E-UTRAN as an end point. The P-GW is a gateway having a PDN as an end point.

Layers of a radio interface protocol between the UE and the network can be classified into a first layer (L1), a second layer (L2), and a third layer (L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

Figure 2:
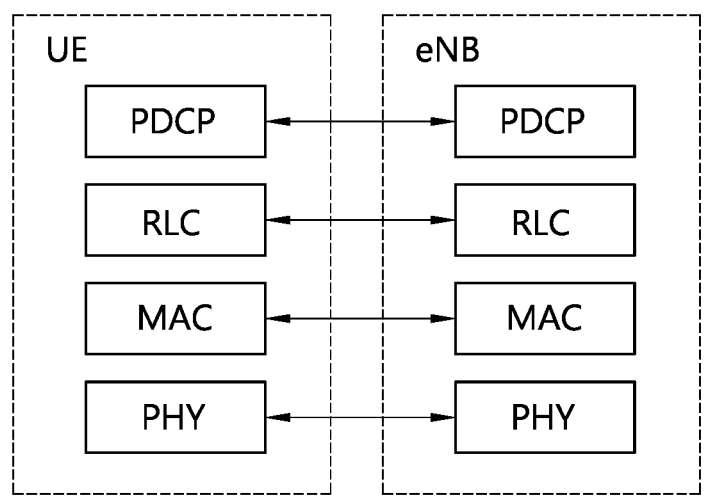
FIG. 2 is a diagram showing a wireless protocol architecture for a user plane.
Figure 3:
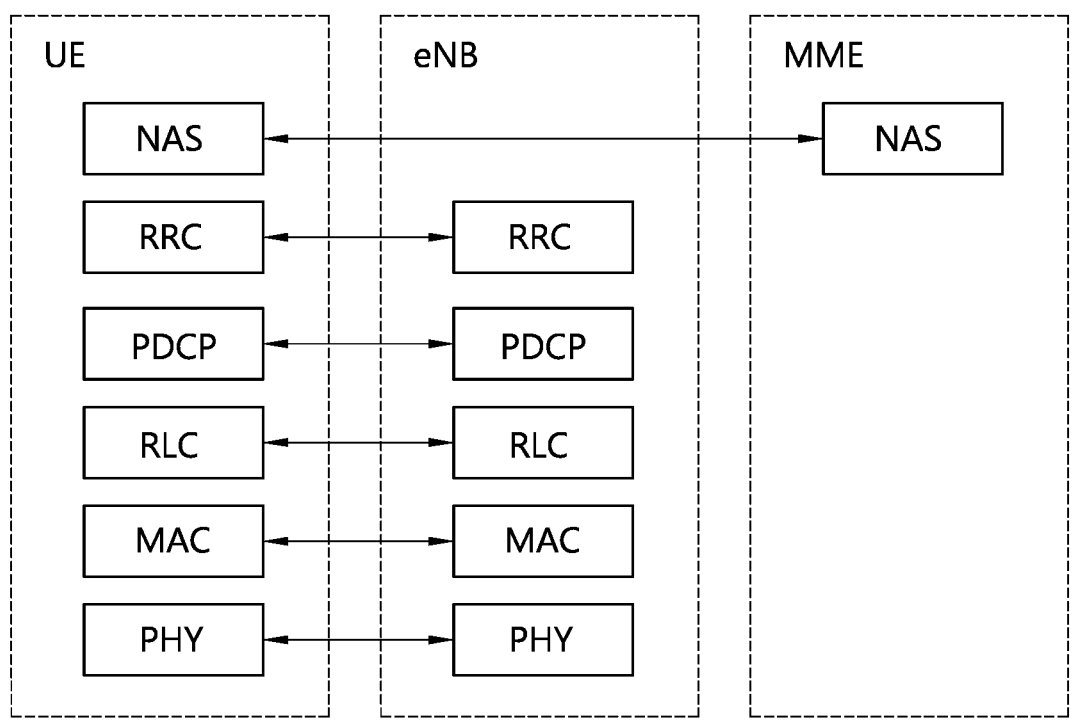
FIG. 3 is a diagram showing a wireless protocol architecture for a control plane.

FIG. 2 is a diagram showing a wireless protocol architecture for a user plane. FIG. 3 is a diagram showing a wireless protocol architecture for a control plane. The user plane is a protocol stack for user data transmission. The control plane is a protocol stack for control signal transmission.

Referring to FIGS. 2 and 3, a PHY layer provides an upper layer with an information transfer service through a physical channel. The PHY layer is connected to a medium access control (MAC) layer which is an upper layer of the PHY layer through a transport channel. Data is transferred between the MAC layer and the PHY layer through the transport channel. The transport channel is classified according to how and with what characteristics data is transferred through a radio interface.

Data is moved between different PHY layers, that is, the PHY layers of a transmitter and a receiver, through a physical channel. The physical channel may be modulated according to an Orthogonal Frequency Division Multiplexing (OFDM) scheme, and use the time and frequency as radio resources.

The functions of the MAC layer include mapping between a logical channel and a transport channel and multiplexing and demultiplexing to a transport block that is provided through a physical channel on the transport channel of a MAC Service Data Unit (SDU) that belongs to a logical channel. The MAC layer provides service to a Radio Link Control (RLC) layer through the logical channel.

The functions of the RLC layer include the concatenation, segmentation, and reassembly of an RLC SDU. In order to guarantee various types of Quality of Service (QoS) required by a Radio Bearer (RB), the RLC layer provides three types of operation mode: Transparent Mode (TM), Unacknowledged Mode (UM), and Acknowledged Mode (AM). AM RLC provides error correction through an Automatic Repeat Request (ARQ).

The RRC layer is defined only on the control plane. The RRC layer is related to the configuration, reconfiguration, and release of radio bearers, and is responsible for control of logical channels, transport channels, and PHY channels. An RB means a logical route that is provided by the first layer (PHY layer) and the second layers (MAC layer, the RLC layer, and the PDCP layer) in order to transfer data between UE and a network.

The function of a Packet Data Convergence Protocol (PDCP) layer on the user plane includes the transfer of user data and header compression and ciphering. The function of the PDCP layer on the user plane further includes the transfer and encryption/integrity protection of control plane data.

What an RB is configured means a process of defining the characteristics of a wireless protocol layer and channels in order to provide specific service and configuring each detailed parameter and operating method. An RB can be divided into two types of a Signaling RB (SRB) and a Data RB (DRB). The SRB is used as a passage through which an RRC message is transmitted on the control plane, and the DRB is used as a passage through which user data is transmitted on the user plane.

If RRC connection is established between the RRC layer of UE and the RRC layer of an E-UTRAN, the UE is in the RRC connected state. If not, the UE is in the RRC idle state.

A downlink transport channel through which data is transmitted from a network to UE includes a broadcast channel (BCH) through which system information is transmitted and a downlink shared channel (SCH) through which user traffic or control messages are transmitted. Traffic or a control message for downlink multicast or broadcast service may be transmitted through the downlink SCH, or may be transmitted through an additional downlink multicast channel (MCH). Meanwhile, an uplink transport channel through which data is transmitted from UE to a network includes a random access channel (RACH) through which an initial control message is transmitted and an uplink shared channel (SCH) through which user traffic or control messages are transmitted.

Logical channels that are placed over the transport channel and that are mapped to the transport channel include a broadcast control channel (BCCH), a paging control channel (PCCH), a common control channel (CCCH), a multicast control channel (MCCH), and a multicast traffic channel (MTCH).

The physical channel includes several OFDM symbols in the time domain and several subcarriers in the frequency domain. One subframe includes a plurality of OFDM symbols in the time domain. An RB is a resources allocation unit, and includes a plurality of OFDM symbols and a plurality of subcarriers. Furthermore, each subframe may use specific subcarriers of specific OFDM symbols (e.g., the first OFDM symbol) of the corresponding subframe for a physical downlink control channel (PDCCH), that is, an L1/L2 control channel. A Transmission Time Interval (TTI) is a unit time for transmission, e.g., a subframe or a slot.

Hereinafter, a new radio access technology (new RAT, NR) will be described.

As more and more communication devices require more communication capacity, there is a need for improved mobile broadband communication over existing radio access technology. Also, massive machine type communications (MTC), which provides various services by connecting many devices and objects, is one of the major issues to be considered in the next generation communication. In addition, communication system design considering reliability/latency sensitive service/UE is being discussed. The introduction of next generation radio access technology considering enhanced mobile broadband communication (eMBB), massive MTC (mMTC), ultrareliable and low latency communication (URLLC) is discussed. This new technology may be called new radio access technology (new RAT or NR) in the present disclosure for convenience.

Figure 4:
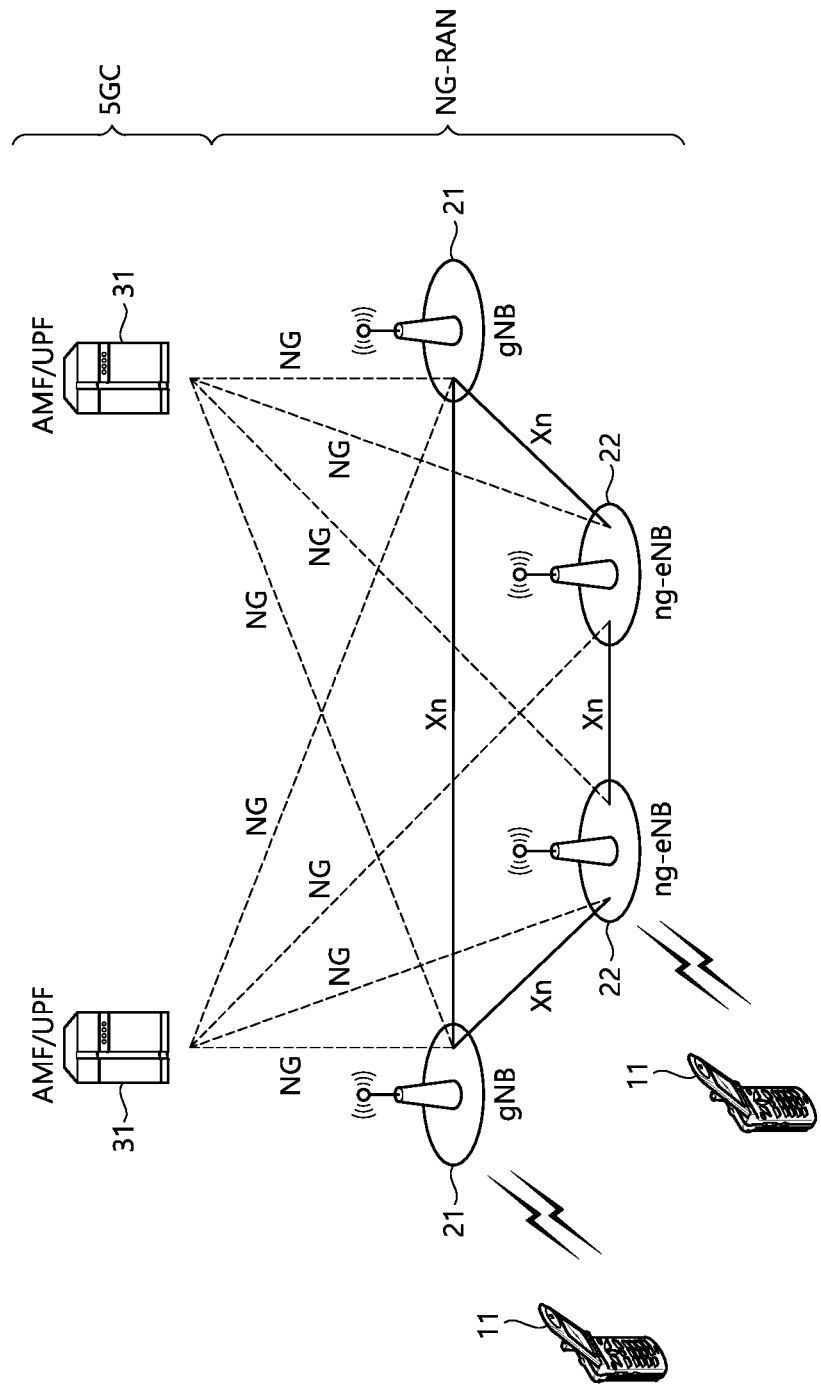
FIG. 4 shows another wireless communication system to which the present disclosure may be applied.

FIG. 4 shows another wireless communication system to which the present disclosure may be applied.

Specifically, FIG. 4 shows a system architecture based on a 5G new radio access technology (NR) system. An entity used in the 5G NR system (hereinafter, simply referred to as "NR") may absorb some or all functions of the entity (e.g., eNB, MIME, S-GW) introduced in FIG. 1 (e.g., eNB, MME, S-GW). The entity used in the NR system may be identified in the name of "NG" to distinguish it from LTE.

Referring to FIG. 4, a wireless communication system includes one or more UEs 11, a next-generation RAN (NG-RAN), and a 5th generation core network (5GC). The NG-RAN consists of at least one NG-RAN node. The NG-RAN node is an entity corresponding to the BS 20 of FIG. 1. The NG-RAN node consists of at least one gNB 21 and/or at least one ng-eNB 22. The gNB 21 provides NR user plane and control plane protocol terminations towards the UE 11. The Ng-eNB 22 provides an E-UTRA user plane and control plane protocol terminations towards the UE 11.

The 5GC includes an access and mobility management function (AMF), a user plane function (UPF), and a session management function (SMF). The AMF hosts functions, such as non-access stratum (NAS) security, idle state mobility processing, and so on. The AMF is an entity including the conventional MMF function. The UPF hosts functions, such as mobility anchoring, protocol data unit (PDU) processing, and so on. The UPF is an entity including the conventional S-GW function. The SMF hosts functions, such as UE Internet Protocol (IP) address allocation, PDU session control, and so on.

The gNB and the ng-eNB are interconnected through an Xn interface. The gNB and the ng-eNB are also connected to the 5GC through an NG interface. More specifically, the gNB and the ng-eNB are connected to the AMF through an NG-C interface, and are connected to the UPF through an NG-U interface.

Figure 5:
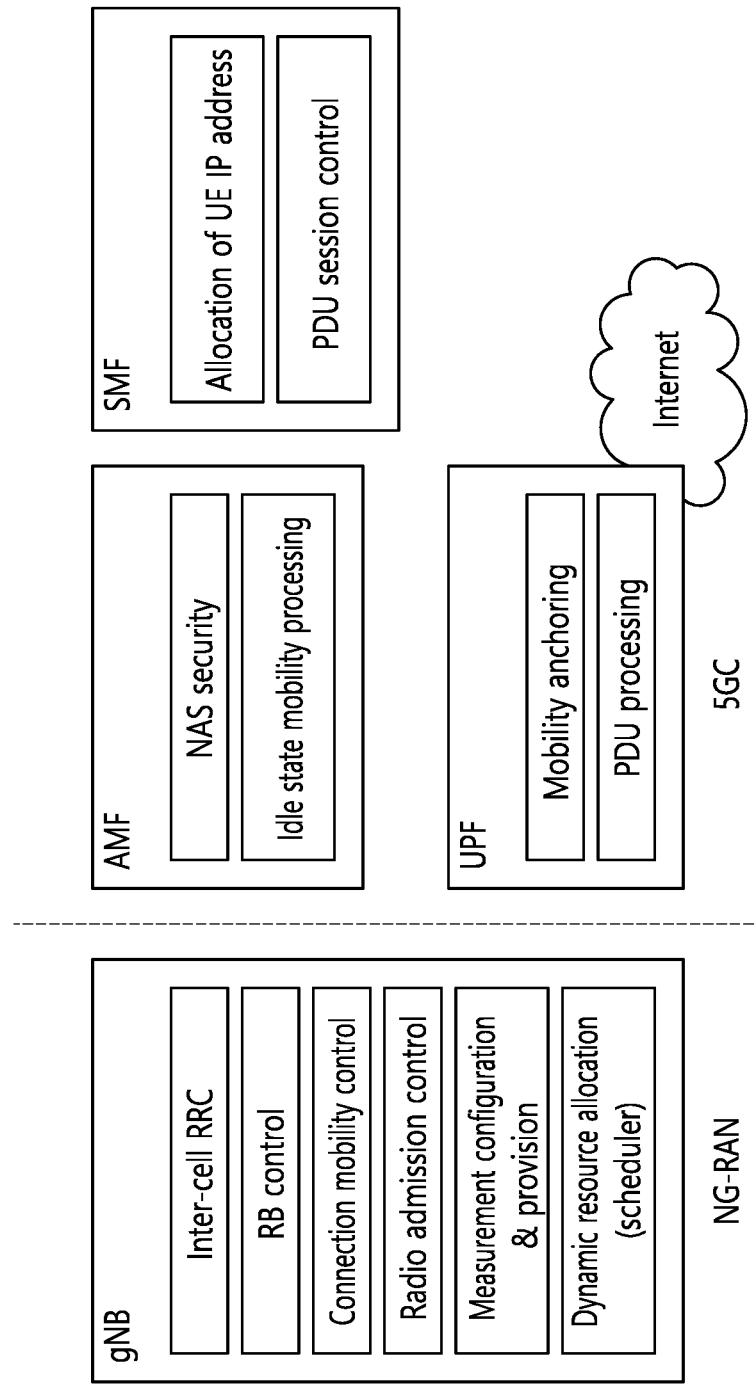
FIG. 5 illustrates a functional division between an NG-RAN and a 5GC.

FIG. 5 illustrates a functional division between an NG-RAN and a 5GC.

Referring to FIG. 5, the gNB may provide functions such as an inter-cell radio resource management (Inter Cell RRM), radio bearer management (RB control), connection mobility control, radio admission control, measurement configuration & provision, dynamic resource allocation, and the like. The AMF may provide functions such as NAS security, idle state mobility handling, and so on. The UPF may provide functions such as mobility anchoring, PDU processing, and the like. The SMF may provide functions such as UE IP address assignment, PDU session control, and so on.

Figure 6:
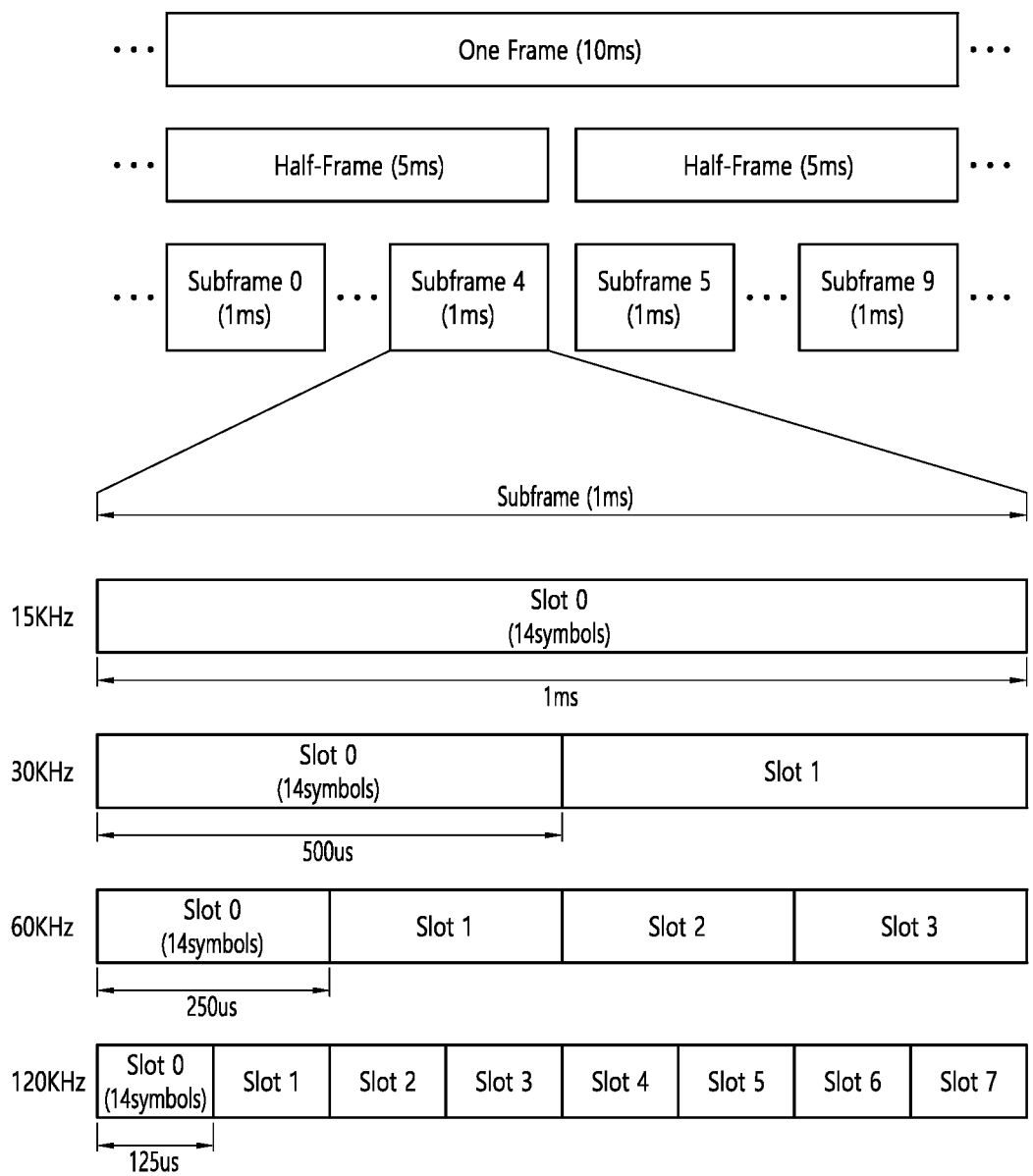
FIG. 6 illustrates an example of a frame structure that may be applied in NR.

FIG. 6 illustrates an example of a frame structure that may be applied in NR.

Referring to FIG. 6, a frame may be composed of 10 milliseconds (ms) and include 10 subframes each composed of 1 ms.

In the NR, uplink and downlink transmissions may be configured on a frame basis. A radio frame has a length of 10 ms, and may be defined as two 5 ms half-frames (HFs). The HF may be defined as five 1 ms sub-frames (SFs). The SF is divided into one or more slots, and the number of slots in the SF depends on a subcarrier spacing (SCS). Each slot includes 12 or 14 OFDM(A) symbols according to a cyclic prefix (CP). When a normal CP is used, each slot includes 14 symbols. When an extended CP is used, each slot includes 12 symbols. Herein, the symbol may include an OFDM symbol (or CP-OFDM symbol) and an SC-FDMA symbol (or DFT-S-OFDM symbol).

One or a plurality of slots may be included in a subframe according to subcarrier spacings.

The following table 1 illustrates a subcarrier spacing configuration

TABLE 1

| μ | Δf = $2^\mu \cdot 15$ [kHz] | Cyclic prefix |
|---|---|---|
| 0 | 15 | Normal |
| 1 | 30 | Normal |
| 2 | 60 | Normal |
|   |    | Extended |
| 3 | 120 | Normal |
| 4 | 240 | Normal |

The following table 2 illustrates the number of slots in a frame ($N^{frame,\mu}_{slot}$), the number of slots in a subframe ($N^{subframe,\mu}_{slot}$), the number of symbols in a slot ($N^{slot}_{symb}$), and the like, according to subcarrier spacing configurations μ.

TABLE 2

| μ | $N^{slot}_{symb}$ | $N^{frame,\mu}_{slot}$ | $N^{subframe,\mu}_{slot}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

Table 3 below illustrates that the number of symbols per slot, the number of slots per frame, and the number of slots per subframe vary depending on the SCS, in case of using an extended CP.

TABLE 3

| SCS(15 * $2^\mu$) | $N^{slot}_{symb}$ | $N^{frame,\mu}_{slot}$ | $N^{subframe,\mu}_{slot}$ |
|---|---|---|---|
| 60 KHz (μ = 2) | 12 | 40 | 4 |

In an NR system, OFDM(A) numerologies (e.g., SCS, CP length, and so on) may be differently configured between a plurality of cells integrated to one UE. Accordingly, an (absolute time) duration of a time resource (e.g., SF, slot or TTI) (for convenience, collectively referred to as a time unit (TU)) configured of the same number of symbols may be differently configured between the integrated cells.

Figure 7:
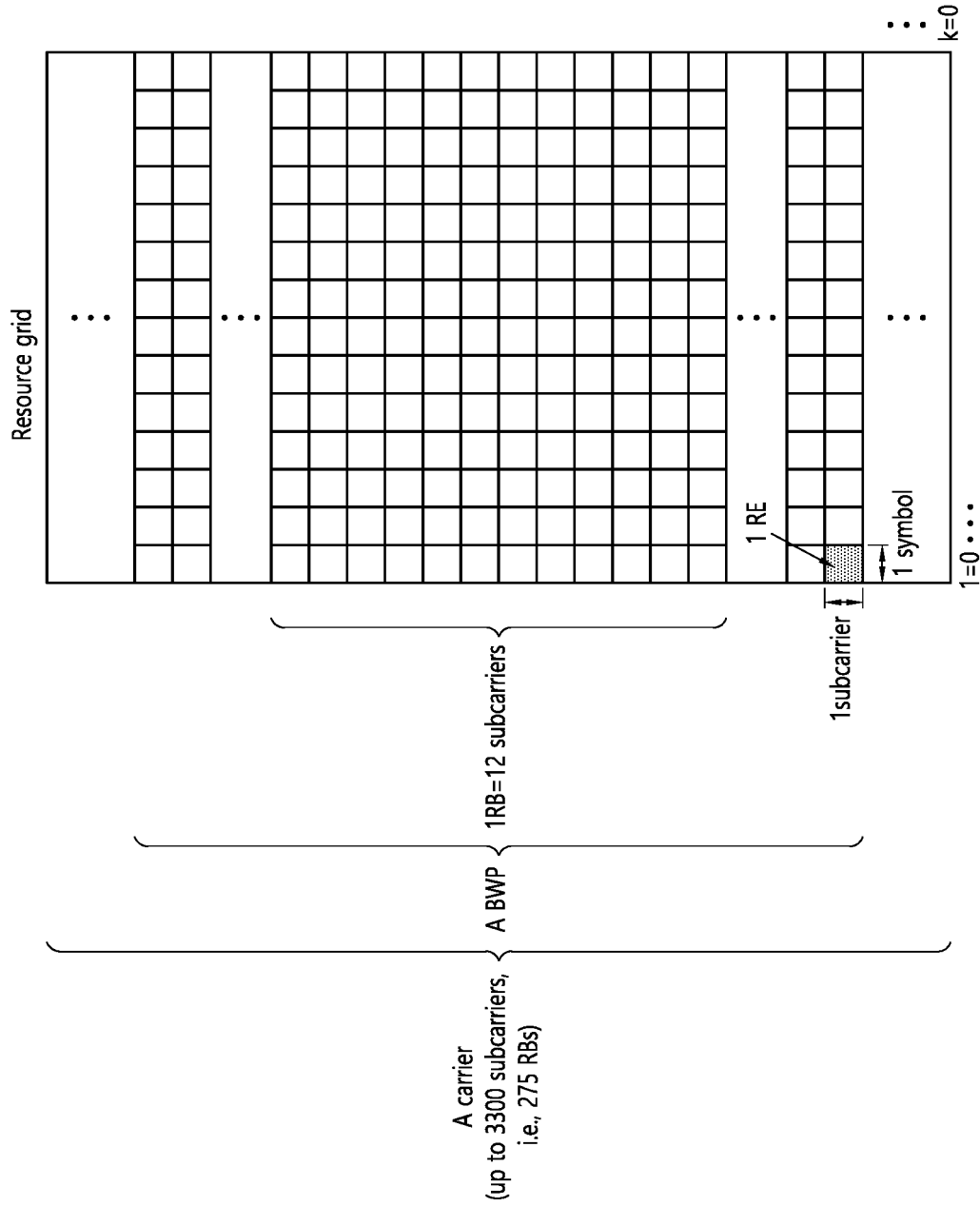
FIG. 7 illustrates a slot structure.

FIG. 7 illustrates a slot structure.

Referring to FIG. 7, a slot includes a plurality of symbols in a time domain. For example, in case of a normal CP, one slot may include 14 symbols. However, in case of an extended CP, one slot may include 12 symbols. Alternatively, in case of the normal CP, one slot may include 7 symbols. However, in case of the extended CP, one slot may include 6 symbols.

A carrier includes a plurality of subcarriers in a frequency domain. A resource block (RB) may be defined as a plurality of consecutive subcarriers (e.g., 12 subcarriers) in the frequency domain. A bandwidth part (BWP) may be defined as a plurality of consecutive (P) RBs in the frequency domain, and the BWP may correspond to one numerology (e.g., SCS, CP length, and so on). The carrier ma include up to N (e.g., 5) BWPs. Data communication may be performed through an activated BWP. Each element may be referred to as a resource element (RE) within a resource grid, and one complex symbol may be mapped thereto.

A physical downlink control channel (PDCCH) may include one or more control channel elements (CCEs) as illustrated in the following table 4.

TABLE 4

| Aggregation level | Number of CCEs |
|---|---|
| 1 | 1 |
| 2 | 2 |
| 4 | 4 |
| 8 | 8 |
| 16 | 16 |

That is, the PDCCH may be transmitted through a resource including 1, 2, 4, 8, or 16 CCEs. Here, the CCE includes six resource element groups (REGs), and one REG includes one resource block in a frequency domain and one orthogonal frequency division multiplexing (OFDM) symbol in a time domain.

A new unit called a control resource set (CORESET) may be introduced in the NR. The UE may receive a PDCCH in the CORESET.

Figure 8:
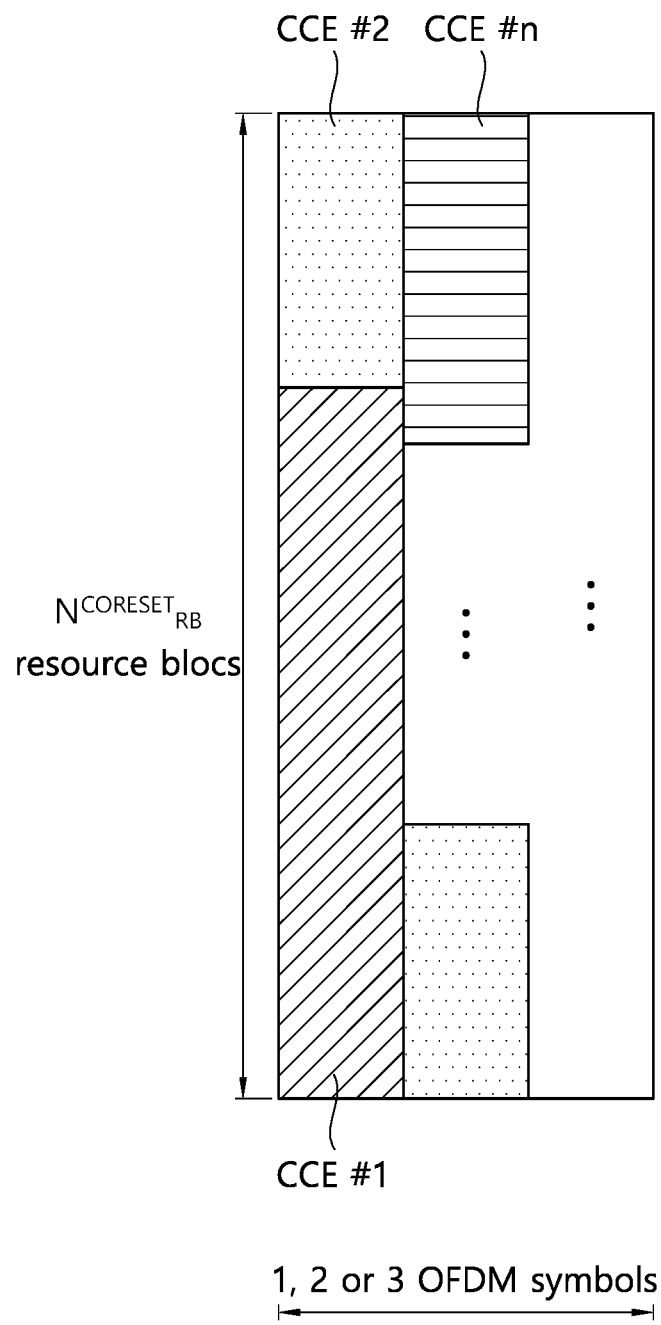
FIG. 8 illustrates CORESET.

FIG. 8 illustrates CORESET.

Referring to FIG. 8, the CORESET includes $N^{CORESET}_{RB}$ number of resource blocks in the frequency domain, and $N^{CORESET}_{symb} \in \{1, 2, 3\}$ number of symbols in the time domain. $N^{CORESET}_{RB}$ and $N^{CORESET}_{symb}$ may be provided by a base station via higher layer signaling. As illustrated in FIG. 8, a plurality of CCEs (or REGs) may be included in the CORESET.

The UE may attempt to detect a PDCCH in units of 1, 2, 4, 8, or 16 CCEs in the CORESET. One or a plurality of CCEs in which PDCCH detection may be attempted may be referred to as PDCCH candidates.

A plurality of CORESETs may be configured for the terminal.

Figure 9:
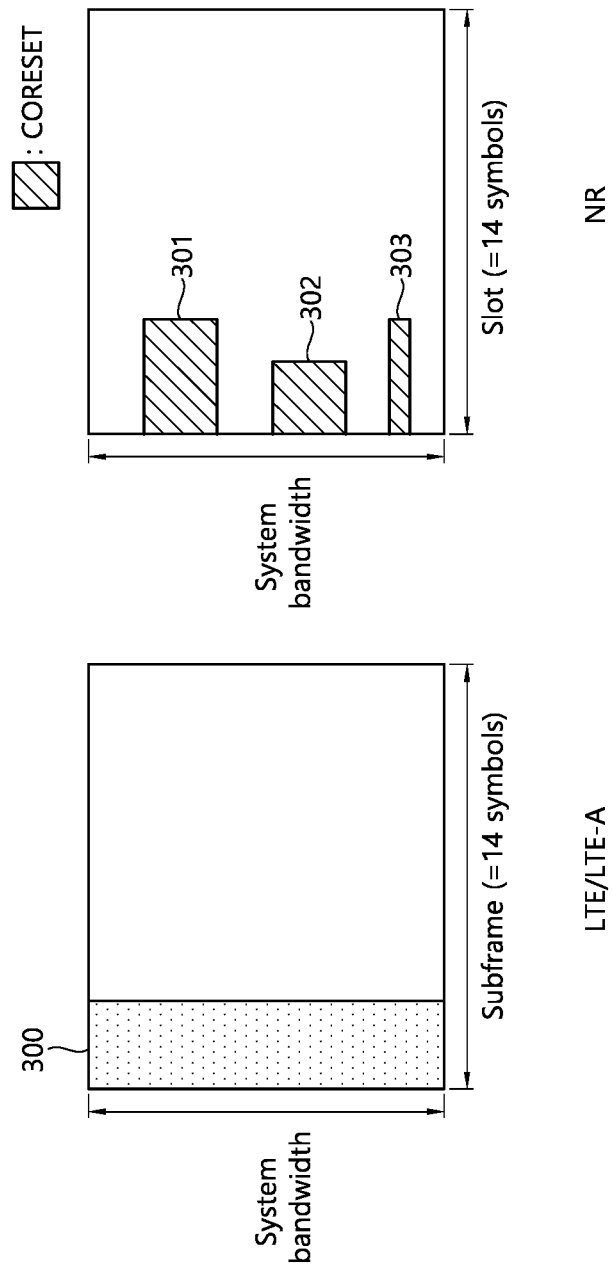
FIG. 9 is a diagram illustrating a difference between a related art control region and the CORESET in NR.

FIG. 9 is a diagram illustrating a difference between a related art control region and the CORESET in NR.

Referring to FIG. 9, a control region 300 in the related art wireless communication system (e.g., LTE/LTE-A) is configured in the entire system band used by a base station (BS). All the terminals, excluding some (e.g., eMTC/NB-IoT terminal) supporting only a narrow band, must be able to receive wireless signals of the entire system band of the BS in order to properly receive/decode control information transmitted by the BS.

On the other hand, in NR, CORESET described above was introduced. CORESETs 301, 302, and 303 are radio resources for control information to be received by the terminal and may use only a portion, rather than the entirety of the system bandwidth. The BS may allocate the CORESET to each UE and may transmit control information through the allocated CORESET. For example, in FIG. 9, a first CORESET 301 may be allocated to UE 1, a second CORESET 302 may be allocated to UE 2, and a third CORESET 303 may be allocated to UE 3. In the NR, the terminal may receive control information from the BS, without necessarily receiving the entire system band.

The CORESET may include a UE-specific CORESET for transmitting UE-specific control information and a common CORESET for transmitting control information common to all UEs.

Meanwhile, NR may require high reliability according to applications. In such a situation, a target block error rate (BLER) for downlink control information (DCI) transmitted through a downlink control channel (e.g., physical downlink control channel (PDCCH)) may remarkably decrease compared to those of conventional technologies. As an example of a method for satisfying requirement that requires high reliability, content included in DCI can be reduced and/or the amount of resources used for DCI transmission can be increased. Here, resources can include at least one of resources in the time domain, resources in the frequency domain, resources in the code domain and resources in the spatial domain.

In NR, the following technologies/features can be applied.

<Self-Contained Subframe Structure>

Figure 10:
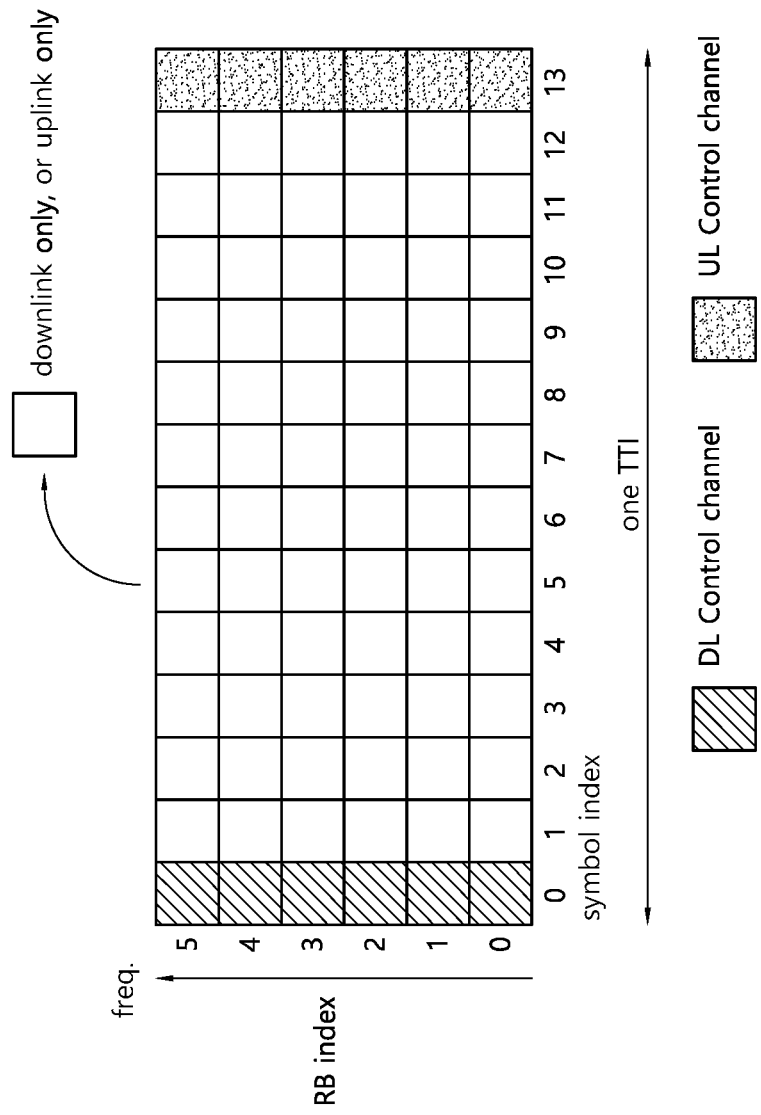
FIG. 10 illustrates an example of a frame structure for new radio access technology.

FIG. 10 illustrates an example of a frame structure for new radio access technology.

In NR, a structure in which a control channel and a data channel are time-division-multiplexed within one TTI, as shown in FIG. 10, can be considered as a frame structure in order to minimize latency.

In FIG. 10, a shaded region represents a downlink control region and a black region represents an uplink control region. The remaining region may be used for downlink (DL) data transmission or uplink (UL) data transmission. This structure is characterized in that DL transmission and UL transmission are sequentially performed within one subframe and thus DL data can be transmitted and UL ACK/NACK can be received within the subframe. Consequently, a time required from occurrence of a data transmission error to data retransmission is reduced, thereby minimizing latency in final data transmission.

In this data and control TDMed subframe structure, a time gap for a base station and a terminal to switch from a transmission mode to a reception mode or from the reception mode to the transmission mode may be required. To this end, some OFDM symbols at a time when DL switches to UL may be set to a guard period (GP) in the self-contained subframe structure.

Figure 11:
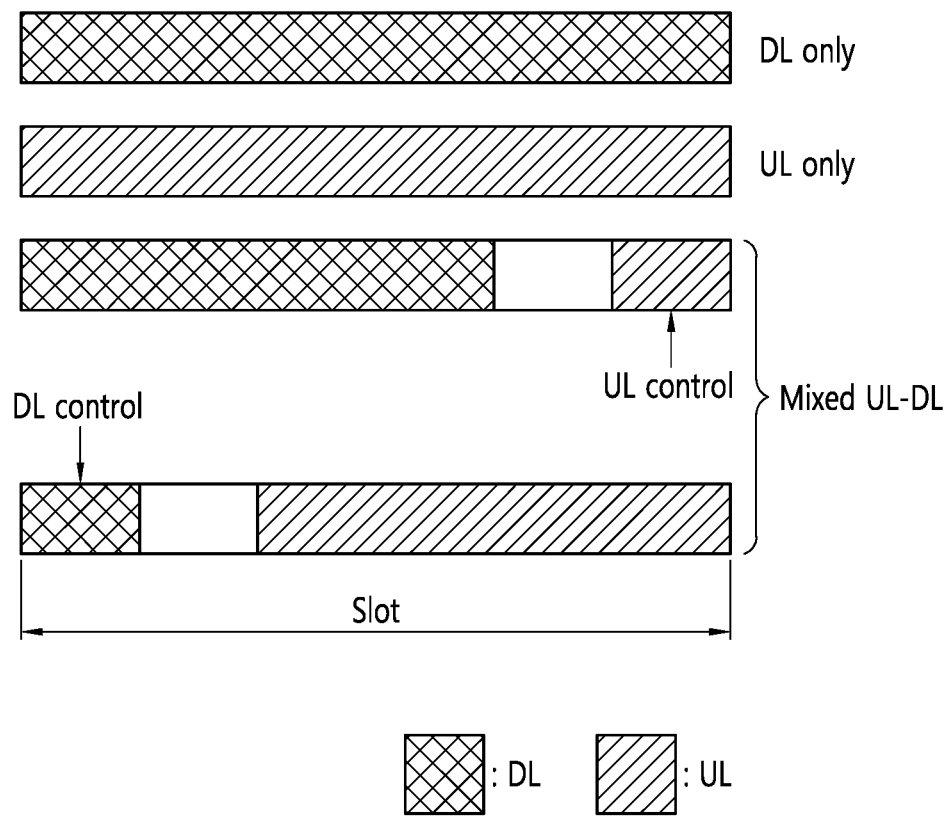
FIG. 11 illustrates a structure of a self-contained slot.

FIG. 11 illustrates a structure of a self-contained slot.

In an NR system, a DL control channel, DL or UL data, a UL control channel, and the like may be contained in one slot. For example, first N symbols (hereinafter, DL control region) in the slot may be used to transmit a DL control channel, and last M symbols (hereinafter, UL control region) in the slot may be used to transmit a UL control channel. N and M are integers greater than or equal to 0. A resource region (hereinafter, a data region) which exists between the DL control region and the UL control region may be used for DL data transmission or UL data transmission. For example, the following configuration may be considered. Respective durations are listed in a temporal order.

1. DL only configuration
2. UL only configuration
3. Mixed UL-DL configuration
   DL region+Guard period (GP)+UL control region
   DL control region+GP+UL region Here, DL region may be (i) DL data region, (ii) DL control region+DL data region. UL region may be (i) UL data region, (ii) UL data region+UL control region.

A PDCCH may be transmitted in the DL control region, and a physical downlink shared channel (PDSCH) may be transmitted in the DL data region. A physical uplink control channel (PUCCH) may be transmitted in the UL control region, and a physical uplink shared channel (PUSCH) may be transmitted in the UL data region. Downlink control information (DCI), for example, DL data scheduling information, UL data scheduling information, and the like, may be transmitted on the PDCCH. Uplink control information (UCI), for example, ACK/NACK information about DL data, channel state information (CSI), and a scheduling request (SR), may be transmitted on the PUCCH. A GP provides a time gap in a process in which a BS and a UE switch from a TX mode to an RX mode or a process in which the BS and the UE switch from the RX mode to the TX mode. Some symbols at the time of switching from DL to UL within a subframe may be configured as the GP.

<Analog Beamforming #1>

Wavelengths are shortened in millimeter wave (mmW) and thus a large number of antenna elements can be installed in the same area. That is, the wavelength is 1 cm at 30 GHz and thus a total of 100 antenna elements can be installed in the form of a 2-dimensional array at an interval of 0.5 lambda (wavelength) in a panel of 5×5 cm. Accordingly, it is possible to increase a beamforming (BF) gain using a large number of antenna elements to increase coverage or improve throughput in mmW.

In this case, if a transceiver unit (TXRU) is provided to adjust transmission power and phase per antenna element, independent beamforming per frequency resource can be performed. However, installation of TXRUs for all of about 100 antenna elements decreases effectiveness in terms of cost. Accordingly, a method of mapping a large number of antenna elements to one TXRU and controlling a beam direction using an analog phase shifter is considered. Such analog beamforming can form only one beam direction in all bands and thus cannot provide frequency selective beamforming.

Hybrid beamforming (BF) having a number B of TXRUs which is smaller than Q antenna elements can be considered as an intermediate form of digital BF and analog BF. In this case, the number of directions of beams which can be simultaneously transmitted are limited to B although it depends on a method of connecting the B TXRUs and the Q antenna elements.

<Analog Beamforming #2>

When a plurality of antennas is used in NR, hybrid beamforming which is a combination of digital beamforming and analog beamforming is emerging. Here, in analog beamforming (or RF beamforming) an RF end performs precoding (or combining) and thus it is possible to achieve the performance similar to digital beamforming while reducing the number of RF chains and the number of D/A (or A/D) converters. For convenience, the hybrid beamforming structure may be represented by N TXRUs and M physical antennas. Then, the digital beamforming for the L data layers to be transmitted at the transmitting end may be represented by an N by L matrix, and the converted N digital signals are converted into analog signals via TXRUs, and analog beamforming represented by an M by N matrix is applied.

Figure 12:
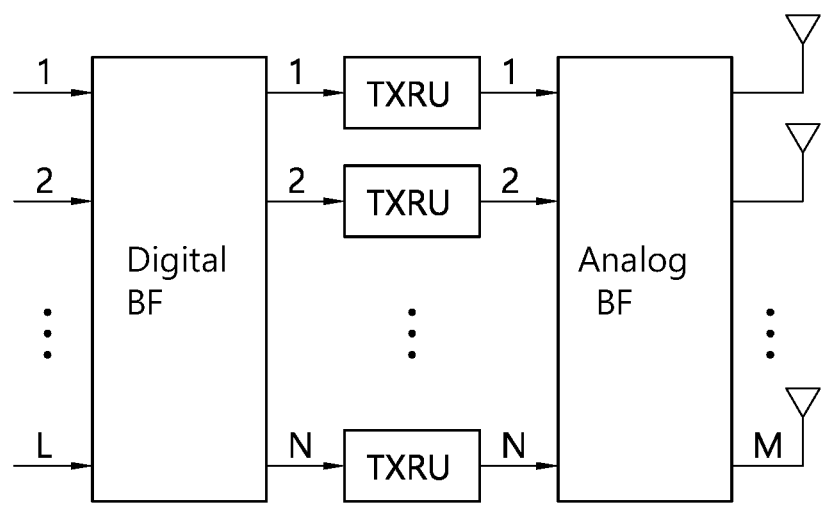
FIG. 12 is an abstract schematic diagram illustrating hybrid beamforming from the viewpoint of TXRUs and physical antennas.

FIG. 12 is an abstract schematic diagram illustrating hybrid beamforming from the viewpoint of TXRUs and physical antennas.

In FIG. 12, the number of digital beams is L and the number of analog beams is N. Further, in the NR system, by designing the base station to change the analog beamforming in units of symbols, it is considered to support more efficient beamforming for a terminal located in a specific area. Furthermore, when defining N TXRUs and M RF antennas as one antenna panel in FIG. 12, it is considered to introduce a plurality of antenna panels to which independent hybrid beamforming is applicable in the NR system.

When a base station uses a plurality of analog beams as described above, analog beams suitable to receive signals may be different for terminals and thus a beam sweeping operation of sweeping a plurality of analog beams to be applied by a base station per symbol in a specific subframe (SF) for at least a synchronization signal, system information and paging such that all terminals can have reception opportunities is considered.

Figure 13:
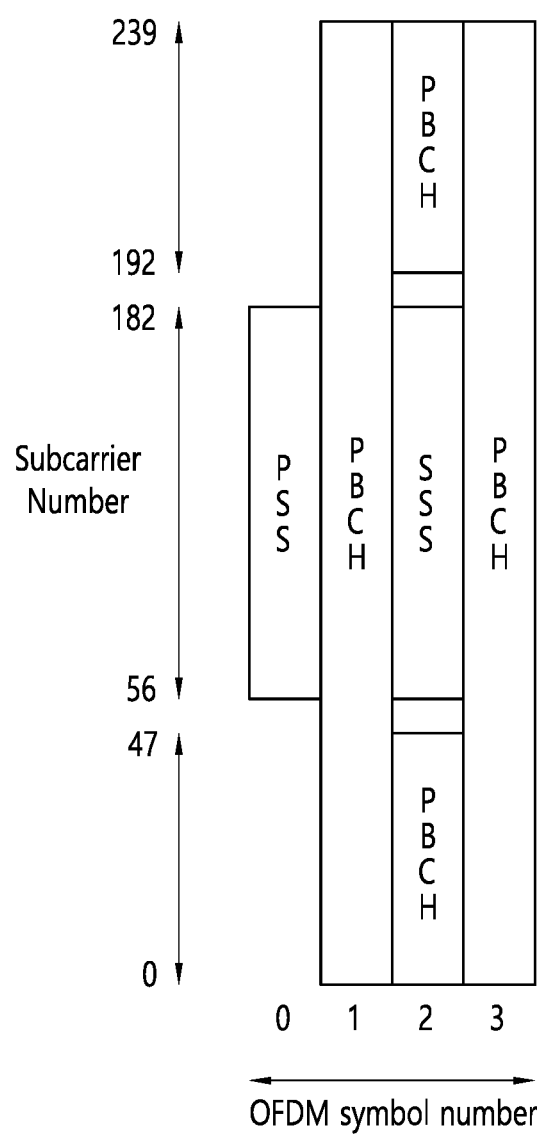
FIG. 13 schematically illustrates a synchronization signal/PBCH (SS/PBCH) block.

FIG. 13 schematically illustrates a synchronization signal/PBCH (SS/PBCH) block.

Referring to FIG. 13, an SS/PBCH block may include a PSS and an SSS, each of which occupies one symbol and 127 subcarriers, and a PBCH, which spans three OFDM symbols and 240 subcarriers where one symbol may include an unoccupied portion in the middle reserved for the SSS. The periodicity of the SS/PBCH block may be configured by a network, and a time position for transmitting the SS/PBCH block may be determined on the basis of subcarrier spacing.

Polar coding may be used for the PBCH. A UE may assume band-specific subcarrier spacing for the SS/PBCH block as long as a network does not configure the UE to assume different subcarrier spacings.

The PBCH symbols carry frequency-multiplexed DMRS thereof. QPSK may be used for the PBCH. 1008 unique physical-layer cell IDs may be assigned.

Regarding a half frame having SS/PBCH blocks, the indexes of first symbols of candidate SS/PBCH blocks are determined according to the subcarrier spacing of SS/PBCH blocks described blow.

Case A—Subcarrier spacing of 15 kHz: The first symbols of the candidate SS/PBCH blocks have an index represented by {2, 8}+14*n where n=0, 1 for a carrier frequency of 3 GHz or less and n=0, 1, 2, 3 for a carrier frequency which is greater than 3 GHz and is less than or equal to 6 GHz.

Case B—Subcarrier spacing of 30 kHz: The first symbols of the candidate SS/PBCH blocks have an index represented by {4, 8, 16, 20}+28*n where n=0 for a carrier frequency of 3 GHz or less and n=0, 1 for a carrier frequency which is greater than 3 GHz and is less than or equal to 6 GHz.

Case C—Subcarrier spacing of 30 kHz: The first symbols of the candidate SS/PBCH blocks have an index represented by {2, 8}+14*n where n=0, 1 for a carrier frequency of 3 GHz or less and n=0, 1, 2, 3 for a carrier frequency which is greater than 3 GHz and is less than or equal to 6 GHz.

Case D—Subcarrier spacing of 120 kHz: The first symbols of the candidate SS/PBCH blocks have an index represented by {4, 8, 16, 20}+28*n where n=0, 1, 2, 3, 5, 6, 7, 8, 10, 11, 12, 13, 15, 16, 17, 18 for a carrier frequency greater than 6 GHz.

Case E—Subcarrier spacing of 240 kHz: The first symbols of the candidate SS/PBCH blocks have an index represented by {8, 12, 16, 20, 32, 36, 40, 44}+56*n where n=0, 1, 2, 3, 5, 6, 7, 8 for a carrier frequency greater than 6 GHz.

The candidate SS/PBCH blocks in the half frame are indexed in ascending order from 0 to L−1 on the time axis. The UE needs to determine two LSBs for L=4 of the SS/PBCH block index per half frame and three LSBs for L>4 from one-to-one mapping with the index of a DM-RS sequence transmitted in the PBCH. For L=64, the UE needs to determine three MSBs of the SS/PBCH block index per half frame by PBCH payload bits.

The indexes of SS/PBCH blocks in which the UE cannot receive other signals or channels in REs overlapping with REs corresponding to the SS/PBCH blocks may be set via a higher-layer parameter 'SSB-transmitted-SIB1'. Further, the indexes of SS/PBCH blocks per serving cell in which the UE cannot receive other signals or channels in REs overlapping with REs corresponding to the SS/PBCH blocks may be set via a higher-layer parameter 'SSB-transmitted'. The setting via 'SSB-transmitted' may override the setting via 'SSB-transmitted-SIB1'. The periodicity of a half frame for reception of SS/PBCH blocks per serving cell may be set via a higher-layer parameter 'SSB-periodicityServingCell'. When the UE does not receive the setting of the periodicity of the half frame for the reception of the SS/PBCH blocks, the UE needs to assume the periodicity of the half frame. The UE may assume that the periodicity is the same for all SS/PBCH blocks in a serving cell.

Figure 14:
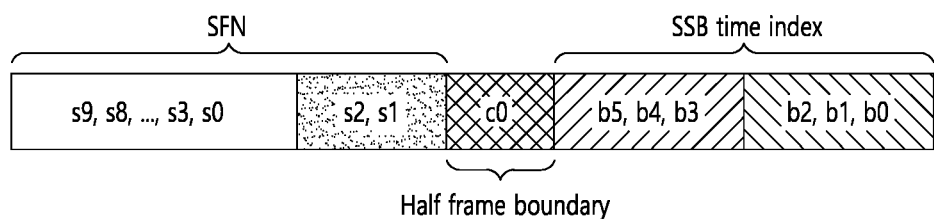
FIG. 14 illustrates a method for a UE to obtain timing information.

FIG. 14 illustrates a method for a UE to obtain timing information.

First, a UE may obtain six-bit SFN information through a master information block (MIB) received in a PBCH. Further, the UE may obtain a four-bit SFN in a PBCH transport block.

Second, the UE may obtain a one-bit half frame indicator as part of a PBCH payload. In less than 3 GHz, the half frame indicator may be implicitly signaled as part of a PBCH DMRS for Lmax=4.

Finally, the UE may obtain an SS/PBCH block index by a DMRS sequence and the PBCH payload. That is, the UE may obtain three bits of LSB of the SS block index by the DMRS sequence for a period of 5 ms. Also, three bits of MSB of timing information are explicitly carried in the PBCH payload (for more than 6 GHz).

In initial cell selection, the UE may assume that a half frame having SS/PBCH blocks occurs with a periodicity of two frames. Upon detecting an SS/PBCH block, when $k_{SSB} \leq 23$ for FR1 and $k_{SSB} \leq 11$ for FR2, the UE determines that a control resource set for a Type0-PDCCH common search space exists. When $k_{SSB} > 23$ for FR1 and $k_{SSB} > 11$ for FR2, the UE determines that there is no control resource set for the Type0-PDCCH common search space.

For a serving cell in which SS/PBCH blocks are not transmitted, the UE obtains time and frequency synchronization of the serving cell based on reception of SS/PBCH blocks on a PCell or PSCell of a cell group for the serving cell.

Hereinafter, acquisition of system information will be described.

System information (SI) is divided into a master information block (MIB) and a plurality of system information blocks (SIBs) where:
  the MIB is transmitted always on a BCH according to a period of 80 ms, is repeated within 80 ms, and includes parameters necessary to obtain system information block type1 (SIB1) from a cell;
  SIB1 is periodically and repeatedly transmitted on a DL-SCH. SIB1 includes information on availability and scheduling (e.g., periodicity or SI window size) of other SIBs. Further, SIB1 indicates whether the SIBs (i.e., the other SIBs) are periodically broadcast or are provided by request. When the other SIBs are provided by request, SIB1 includes information for a UE to request SI;
  SIBs other than SIB1 are carried via system information (SI) messages transmitted on the DL-SCH. Each SI message is transmitted within a time-domain window (referred to as an SI window) periodically occurring;
  For a PSCell and SCells, an RAN provides required SI by dedicated signaling.

Nevertheless, a UE needs to acquire an MIB of the PSCell in order to obtain the SFN timing of a SCH (which may be different from an MCG). When relevant SI for a SCell is changed, the RAN releases and adds the related SCell. For the PSCell, SI can be changed only by reconfiguration with synchronization (sync).

Figure 15:
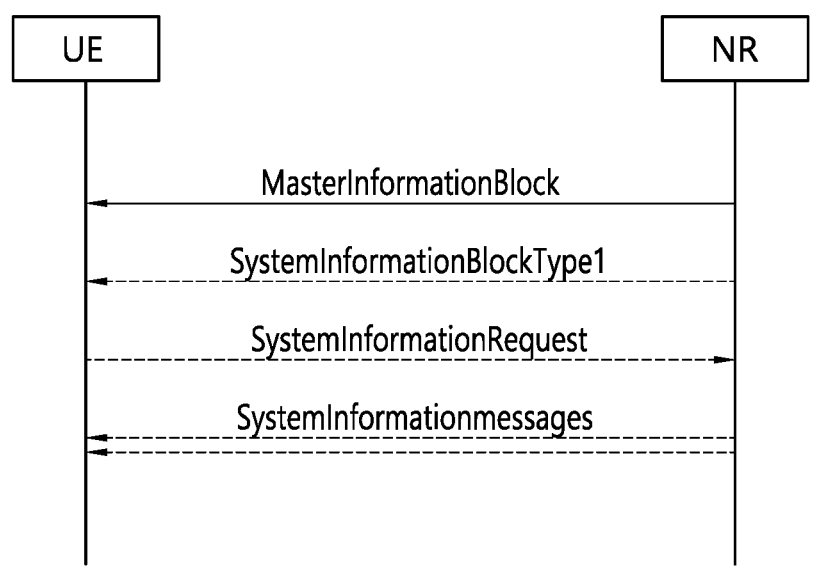
FIG. 15 illustrates an example of a system information acquisition process of a UE.

FIG. 15 illustrates an example of a system information acquisition process of a UE.

Referring to FIG. 15, the UE may receive an MIB from a network and may then receive SIB1. Subsequently, the UE may transmit a system information request to the network and may receive a system information message from the network in response.

The UE may apply a system information acquisition procedure for acquiring access stratum (AS) and non-access stratum (NAS) information.

In RRC_IDLE and RRC_INACTIVE states, the UE needs to ensure valid versions of (at least) the MIB, SIB1, and system information block type X (according to relevant RAT support for mobility controlled by the UE).

In an RRC_CONNECTED state, the UE needs to ensure valid versions of the MIB, SIB1, and system information block type X (according to mobility support for relevant RAT).

The UE needs to store relevant SI obtained from a currently camping/serving cell. The version of the SI obtained and stored by the UE is valid only for a certain period of time. The UE may use this version of the stored SI, for example, after cell reselection, after return from out of coverage, or after indication of a system information change.

Hereinafter, random access will be described.

A UE's random access procedure may be summarized in Table 5.

TABLE 5

| | Type of signal | Operation/obtained information |
|---|---|---|
| Step 1 | Uplink PRACH preamble | To obtain initial beam<br>Random election of RA-preamble ID |
| Step 2 | Random access response on DL-SCH | Timing alignment information<br>RA-preamble ID<br>Initial uplink grant, temporary C-RNTI |
| Step 3 | Uplink transmission on UL-SCH | RRC connection request<br>UE identifier |
| Step 4 | Downlink contention resolution | C-RNTI on PDCCH for initial access<br>C-RNTI on PDCCH for RRC_CONNECTED UE |

Figure 16:
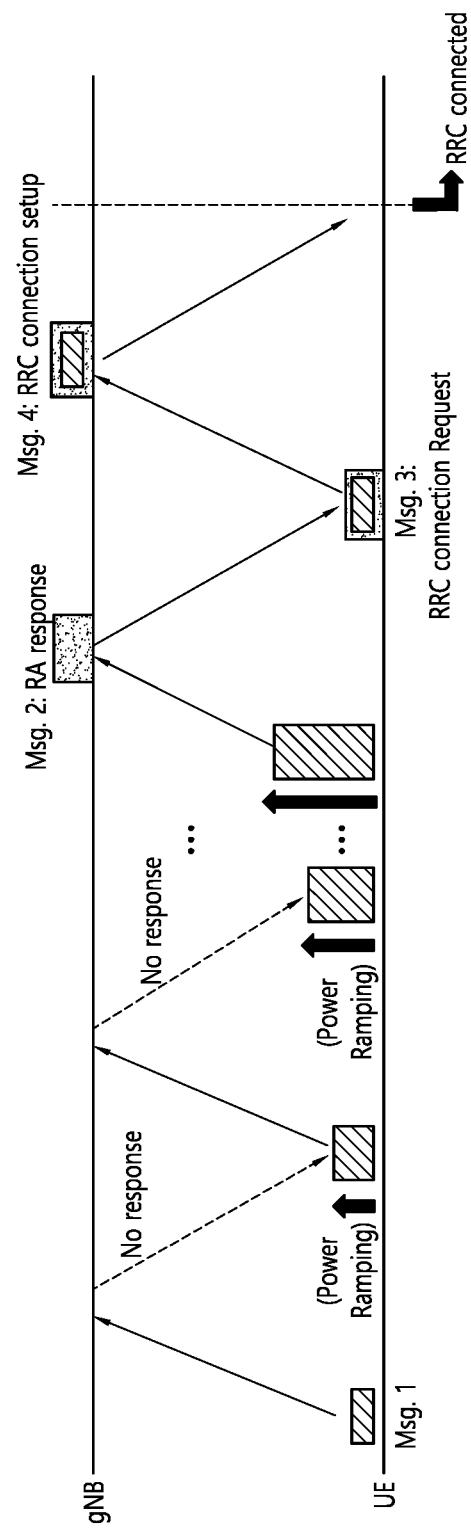
FIG. 16 illustrates a random access procedure.

FIG. 16 illustrates a random access procedure.

Referring to FIG. 16, first, a UE may transmit a PRACH preamble as Msg 1 of the random access procedure via an uplink.

Two random access preamble sequences having different lengths are supported. A long sequence having a length of 839 is applied to a subcarrier spacing of 1.25 kHz and 5 kHz, and a short sequence having a length of 139 is applied to a subcarrier spacing of 15 kHz, 30 kHz, 60 kHz, and 120 kHz. The long sequence supports an unrestricted set and restricted sets of type A and type B, while the short sequence may support only an unrestricted set.

A plurality of RACH preamble formats is defined by one or more RACH OFDM symbols, different cyclic prefixes (CPs), and a guard time. A PRACH preamble setting to be used is provided to the UE as system information.

When there is no response to Msg1, the UE may retransmit the power-ramped PRACH preamble within a specified number of times. The UE calculates PRACH transmission power for retransmission of the preamble based on the most recent estimated path loss and a power ramping counter. When the UE performs beam switching, the power ramping counter does not change.

Figure 17:
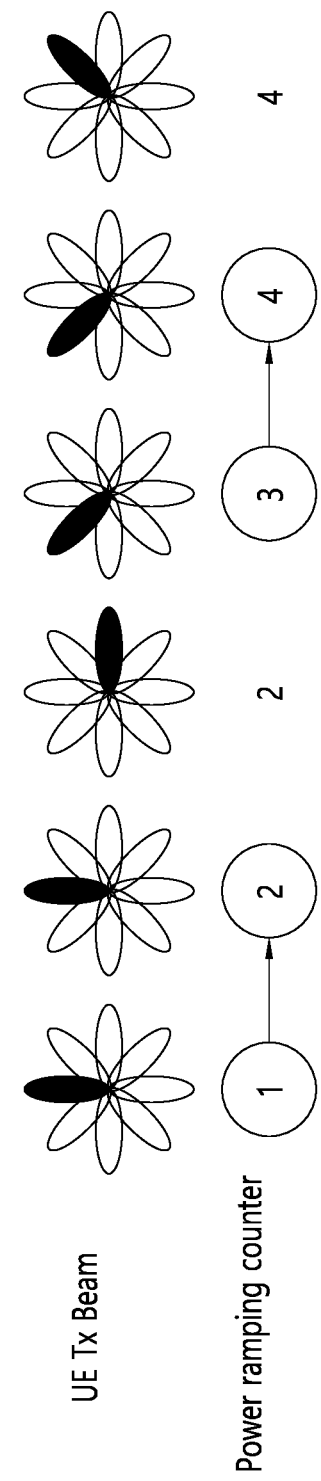
FIG. 17 illustrates a power ramping counter.

FIG. 17 illustrates a power ramping counter.

A UE may perform power ramping for retransmission of a random access preamble based on a power ramping counter. Here, as described above, when the UE performs beam switching in PRACH retransmission, the power ramping counter does not change.

Referring to FIG. 17, when the UE retransmits the random access preamble for the same beam, the UE increases the power ramping counter by 1, for example, the power ramping counter is increased from 1 to 2 and from 3 to 4. However, when the beam is changed, the power ramping counter does not change in PRACH retransmission.

Figure 18:
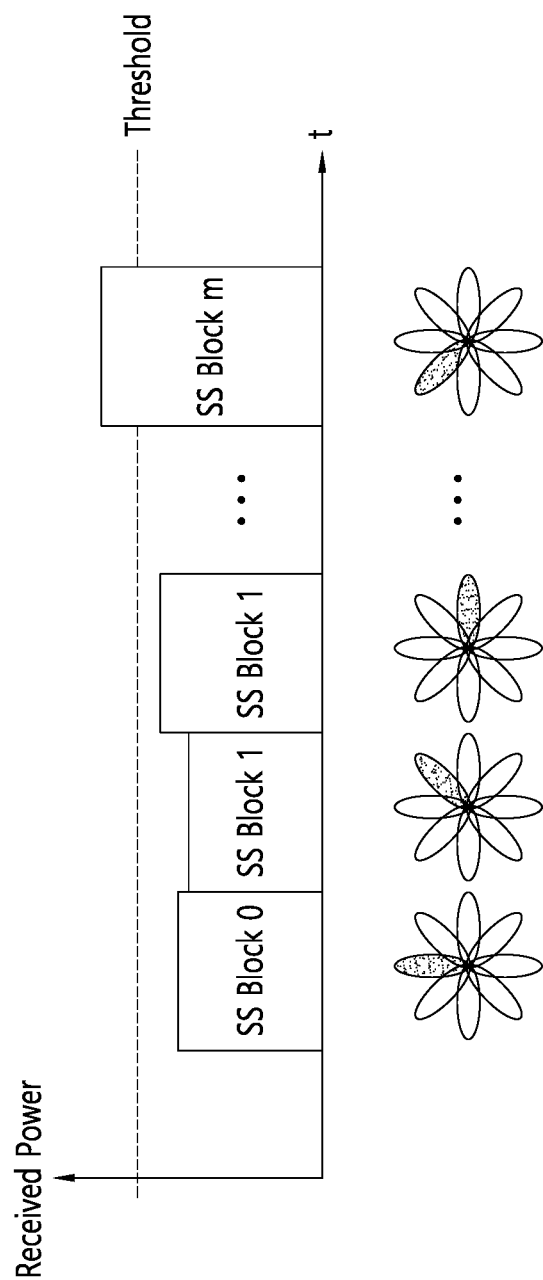
FIG. 18 illustrates the concept of the threshold of an SS block in a relationship with an RACH resource.

FIG. 18 illustrates the concept of the threshold of an SS block in a relationship with an RACH resource.

A UE knows the relationship between SS blocks and RACH resources through system information. The threshold of an SS block in a relationship with an RACH resource is based on RSRP and a network configuration. Transmission or retransmission of a RACH preamble is based on an SS block satisfying the threshold. Therefore, in the example of FIG. 18, since SS block m exceeds the threshold of received power, the RACH preamble is transmitted or retransmitted based on SS block m.

Subsequently, when the UE receives a random access response on a DL-SCH, the DL-SCH may provide timing alignment information, an RA-preamble ID, an initial uplink grant, and a temporary C-RNTI.

Based on the information, the UE may perform uplink transmission of Msg3 of the random access procedure on a UL-SCH. Msg3 may include an RRC connection request and a UE identifier.

In response, a network may transmit Msg4, which can be considered as a contention resolution message, via a downlink. Upon receiving this message, the UE can enter the RRC-connected state.

<Bandwidth Part (BWP)>

In the NR system, a maximum of 400 MHz can be supported per component carrier (CC). If a UE operating in such a wideband CC operates with RF for all CCs turn on all the time, UE battery consumption may increase. Otherwise, considering use cases operating in one wideband CC (e.g., eMBB, URLLC, mMTC, etc.), different numerologies (e.g., subcarrier spacings (SCSs)) can be supported for different frequency bands in the CC. Otherwise, UEs may have different capabilities for a maximum bandwidth. In consideration of this, an eNB may instruct a UE to operate only in a part of the entire bandwidth of a wideband CC, and the part of the bandwidth is defined as a bandwidth part (BWP) for convenience. A BWP can be composed of resource blocks (RBs) consecutive on the frequency axis and can correspond to one numerology (e.g., a subcarrier spacing, a cyclic prefix (CP) length, a slot/mini-slot duration, or the like).

Meanwhile, the eNB can configure a plurality of BWPs for a UE even within one CC. For example, a BWP occupying a relatively small frequency domain can be set in a PDCCH monitoring slot and a PDSCH indicated by a PDCCH can be scheduled on a BWP wider than the BWP. When UEs converge on a specific BWP, some UEs may be set to other BWPs for load balancing. Otherwise, BWPs on both sides of a bandwidth other than some spectra at the center of the bandwidth may be configured in the same slot in consideration of frequency domain inter-cell interference cancellation between neighbor cells. That is, the eNB can configure at least one DL/UL BWP for a UE associated with (=related with) a wideband CC and activate at least one of DL/UL BWPs configured at a specific time (through L1 signaling or MAC CE or RRC signaling), and switching to other configured DL/UL BWPs may be indicated (through L1 signaling or MAC CE or RRC signaling) or switching to a determined DL/UL BWP may occur when a timer value expires on the basis of a timer. Here, an activated DL/UL BWP is defined as an active DL/UL BWP. However, a UE may not receive a configuration for a DL/UL BWP when the UE is in an initial access procedure or RRC connection is not set up. In such a situation, a DL/UL BWP assumed by the UE is defined as an initial active DL/UL BWP.

<Discontinuous Reception (DRX)>

Discontinuous reception (DRX) refers to an operation mode that enables a UE to reduce battery consumption and to discontinuously receive a downlink channel. That is, the UE configured in DRX may discontinuously receive a DL signal, thereby reducing power consumption.

A DRX operation is performed within a DRX cycle indicating a time period in which an on duration is periodically repeated. The DRX cycle includes an on duration and a sleep duration (or opportunity for DRX). The on duration indicates a time period in which a UE monitors a PDCCH to receive the PDCCH.

DRX may be performed in a radio resource control (RRC) IDLE state (or mode), RRC_INACTIVE state (or mode), or RRC_CONNECTED state (or mode). In the RRC_IDLE state and the RRC_INACTIVE state, DRX may be used to discontinuously receive a paging signal.

RRC_IDLE state: State in which a wireless connection (RRC connection) is not established between a base station and a UE.

RRC_INACTIVE state: State in which a wireless connection (RRC connection) is established between a base station and a UE but is deactivated.

RRC_CONNECTED state: State in which a radio connection (RRC connection) is established between a base station and a UE.

DRX may be basically divided into idle-mode DRX, connected DRX (C-DRX), and extended DRX.

DRX applied in the idle state may be referred to as idle-mode DRX, and DRX applied in the connected state may be referred to as connected-mode DRX (C-DRX).

Extended/enhanced DRX (eDRX) is a mechanism capable of extending the cycle of idle-mode DRX and C-DRX and may be mainly used for application of (massive) IoT. In idle-mode DRX, whether to allow eDRX may be configured based on system information (e.g., SIB1). SIB1 may include an eDRX-allowed parameter. The eDRX-allowed parameter is a parameter indicating whether idle-mode extended DRX is allowed.

<Idle-Mode DRX>

In the idle mode, a UE may use DRX to reduce power consumption. One paging occasion (PO) is a subframe in which a paging-radio network temporary identifier (P-RNTI) can be transmitted through a physical downlink control channel (PDCCH), a MTC PDCCH (MPDCCH), or a narrowband PDCCH (NPDCCH) (addressing a paging message for NB-IoT).

In a P-RNTI transmitted through an MPDCCH, PO may indicate a starting subframe of an MPDCCH repetition. In the case of a P-RNTI transmitted through an NPDCCH, when a subframe determined based on a PO is not a valid NB-IoT downlink subframe, the PO may indicate a starting subframe of an NPDCCH repetition. Therefore, a first valid NB-IoT downlink subframe after the PO is the starting subframe of the NPDCCH repetition.

One paging frame (PF) is one radio frame that may include one or a plurality of paging occasions. When DRX is used, the UE needs to monitor only one PO per DRX cycle. One paging narrow band (PNB) is one narrow band in which the UE receives a paging message. A PF, a PO and a PNB may be determined based on DRX parameters provided via system information.

Figure 19:
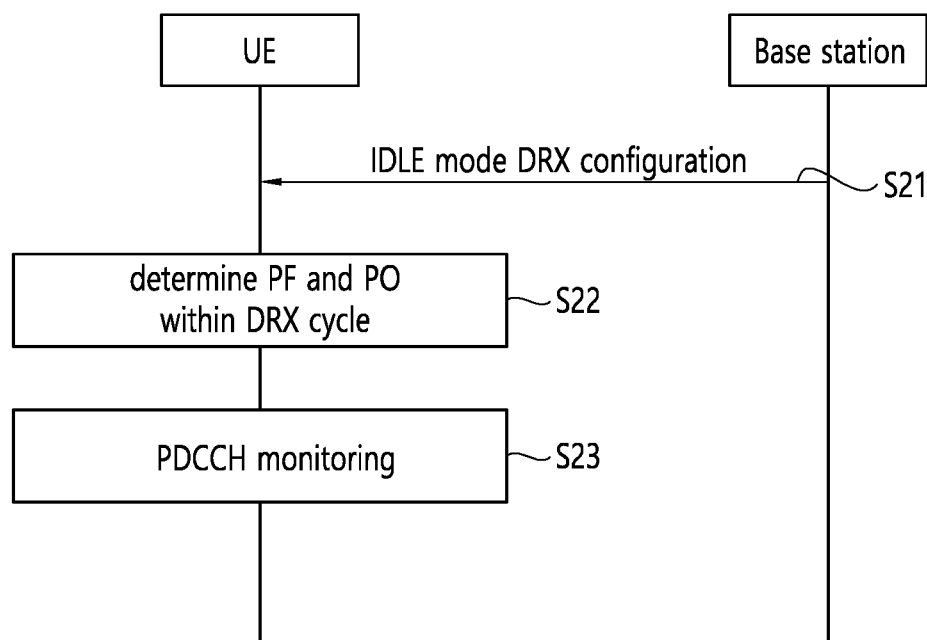
FIG. 19 is a flowchart illustrating an example of performing an idle-mode DRX operation.

FIG. 19 is a flowchart illustrating an example of performing an idle-mode DRX operation.

Referring to FIG. 19, a UE may receive idle-mode DRX configuration information from a base station through higher-layer signaling (e.g., system information) (S21).

The UE may determine a paging frame (PF) and a paging occasion (PO) to monitor a PDCCH in a paging DRX cycle based on the idle-mode DRX configuration information (S22). In this case, the DRX cycle may include an on duration and a sleep duration (or opportunity for DRX).

The UE may monitor a PDCCH in the PO of the determined PF (S23). Here, for example, the UE monitors only one subframe (PO) per paging DRX cycle. In addition, when the UE receives a PDCCH scrambled with a P-RNTI in the on duration (that is, when paging is detected), the UE may transition to a connected mode and may transmit and receive data to and from the base station.

<Connected-Mode DRX (C-DRX)>

C-DRX refers to DRX applied in the RRC connected state. The DRX cycle of C-DRX may include a short DRX cycle and/or a long DRX cycle. Here, the short DRX cycle may be optional.

When C-DRX is configured, a UE may perform PDCCH monitoring for an on duration. When a PDCCH is successfully detected during the PDCCH monitoring, the UE may operate (or run) an inactivity timer and may maintain an awake state. However, when the PDCCH is not successfully detected during the PDCCH monitoring, the UE may enter a sleep state after the on duration expires.

When C-DRX is configured, a PDCCH reception occasion (e.g., a slot having a PDCCH search space) may be discontinuously configured based on the C-DRX configuration. However, when C-DRX is not configured, a PDCCH reception occasion (e.g., a slot having a PDCCH search space) can be continuously configured in the present disclosure.

PDCCH monitoring may be limited to a time period set as a measurement gap regardless of a C-DRX configuration.

Figure 20:
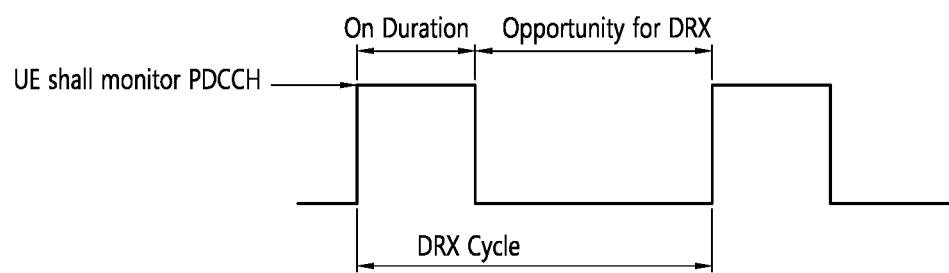
FIG. 20 illustrates a DRX cycle.

FIG. 20 illustrates a DRX cycle.

Referring to FIG. 20, the DRX cycle includes an 'on duration (hereinafter, also referred to as a 'DRX-on duration') and an 'opportunity for DRX'. The DRX cycle defines a time interval in which the on-duration is cyclically repeated. The on-duration indicates a time duration in which a UE performs monitoring to receive a PDCCH. If DRX is configured, the UE performs PDCCH monitoring during the 'on-duration'. If there is a PDCCH successfully detected during the PDCCH monitoring, the UE operates an inactivity timer and maintains an awake state. On the other hand, if there is no PDCCH successfully detected during the PDCCH monitoring, the UE enters a sleep state after the 'on-duration' ends. Therefore, when the DRX is configured, in the performing of the procedure and/or methods described/proposed above, PDCCH monitoring/reception may be performed discontinuously in a time domain. For example, when the DRX is configured, in the present disclosure, a PDCCH reception occasion (e.g., a slot having a PDCCH search space) may be configured discontinuously according to the DRX configuration. Otherwise, if the DRX is not configured, in the performing of the procedure and/or methods described/proposed above, PDCCH monitoring/reception may be performed continuously in the time domain. For example, when the DRX is not configured, in the present disclosure, a PDCCH reception occasion (e.g., a slot having a PDCCH search space) may be configured continuously. Meanwhile, regardless of whether the DRX is configured, PDCCH monitoring may be restricted in a duration configured as a measurement gap.

Table 6 shows a UE procedure related to DRX (RRC_CONNECTED state). Referring to Table 6, DRX configuration information may be received through higher layer (e.g., RRC) signaling. Whether DRX is ON or OFF may be controlled by a DRX command of a MAC layer. If the DRX is configured, PDCCH monitoring may be performed discontinuously.

TABLE 6

| | Type of signals | UE procedure |
|---|---|---|
| $1^{st}$ step | RRC signalling (MAC-CellGroupConfig) | Receive DRX configuration information |
| $2^{nd}$ step | MAC CE ((Long) DRX command MAC CE) | Receive DRX command |
| $3^{rd}$ step | — | Monitor a PDCCH during an on-duration of a DRX cycle |

MAC-CellGroupConfig may include configuration information required to configure a medium access control (MAC) parameter for a cell group. MAC-CellGroupConfig may also include configuration information regarding DRX. For example, MAC-CellGroupConfig may include information for defining DRX as follows.

Value of drx-OnDurationTimer: This defines a length of a starting duration of a DRX cycle. It may be a timer related to a DRX-on duration.

Value of drx-InactivityTimer: This defines a length of a time duration in which the UE is in an awake state, after a PDCCH occasion in which a PDCCH indicating initial UL or DL data is detected.

Value of drx-HARQ-RTT-TimerDL: This defines a length of a maximum time duration until DL retransmission is received, after DL initial transmission is received.

Value of drx-HARQ-RTT-TimerDL: This defines a length of a maximum time duration until a grant for UL retransmission is received, after a grant for UL initial transmission is received.

drx-LongCycleStartOffset: This defines a time length and a starting point of a DRX cycle drx-ShortCycle (optional): This defines a time length of a short DRX cycle.

Herein, if any one of drx-OnDurationTimer, drx-InactivityTimer, drx-HARQ-RTT-TimerDL, and drx-HARQ-RTT-TimerDL is operating, the UE performs PDCCH monitoring in every PDCCH occasion while maintaining an awake state.

Hereinafter, proposals of the present disclosure will be described in more detail.

The following drawings are prepared to explain specific examples of the present disclosure. Since the names of specific devices described in the drawings or the names of specific signals/messages/fields are presented by way of example, the technical features of the present disclosure are not limited to the specific names used in the drawings below.

Meanwhile, in the following description, DCI format 2_6, DCI format 3_0, and wake up-DCI for a wake up signal may be interpreted as being identical to each other.

Currently, in NR, a wake up signal (WUS) is considered for power saving of the terminal. In addition, the wake up signal may be defined in a manner of indicating whether to perform PDCCH monitoring in a DRX on-duration period or on-duration in connection with a DRX operation. New DCI for the wake up signal is considered, and a channel configuration for smoothly performing a wake-up signal operation through the new DCI is required. In the present disclosure, the new DCI may be referred to as WUS DCI or wake up-DCI.

Accordingly, the present disclosure proposes a control channel configuration for wake up-DCI transmission and reception, a fallback operation for a case where wake up-DCI transmission and reception are not smooth, and the like. Meanwhile, in the present disclosure, the term wake up signal may mean a PDCCH based power saving signal/channel under discussion in 3GPP standardization.

Figure 21:
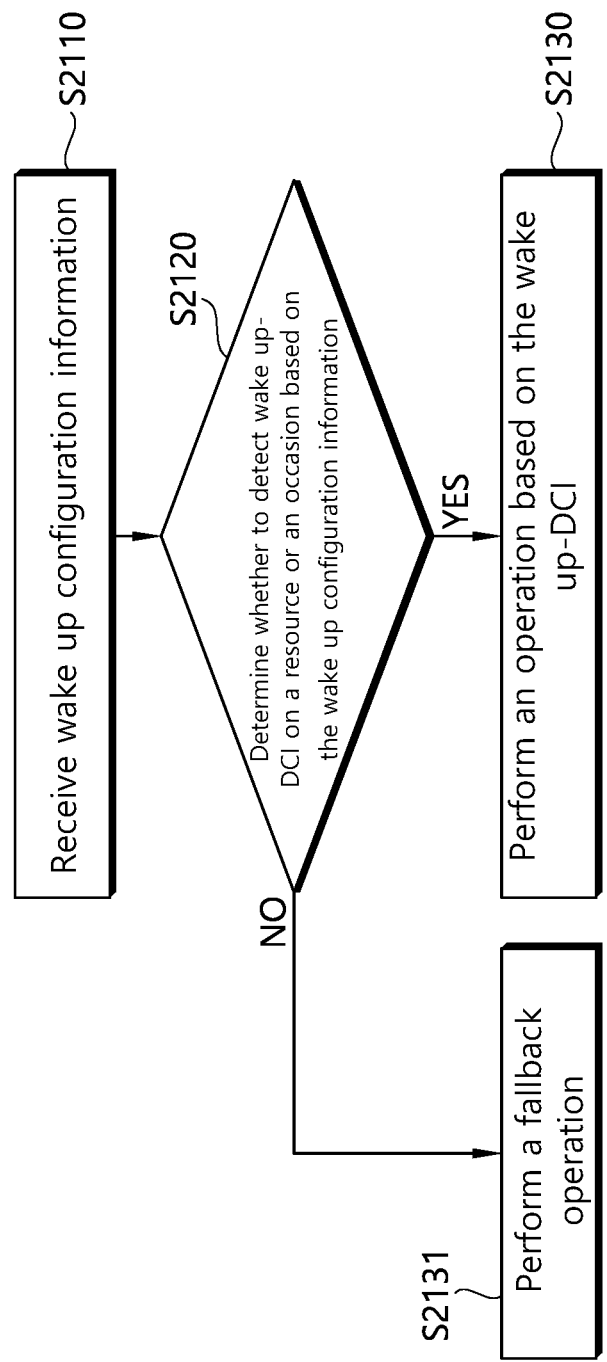
FIG. 21 is a flowchart of an example of a wake up-DCI-related operation of a UE.

FIG. 21 is a flowchart of an example of a wake up-DCI-related operation of a UE.

Referring to FIG. 21, the UE receives wake up configuration information (S2110). Here, the wake up configuration information may include configuration information for transmission/reception of a wake-up signal and/or wake up-DCI of the UE.

Thereafter, the UE determines whether to detect wake up-DCI on a resource or an occasion based on the wake up configuration information (S2120).

When the UE detects the wake up-DCI, the UE performs an operation based on the wake up-DCI (S2130). Here, the operation may be an operation related to a power saving scheme.

When the UE does not detect the wake up-DCI, the UE performs a fallback operation (S2131).

Meanwhile, each step of FIG. 21 may refer to the following description. However, FIG. 21 is only an embodiment of the UE operation, and is not necessarily limited thereto. A configuration for transmission/reception of a wake up signal or wake up-DCI may be provided by, for example, a higher layer signal such as an RRC signal.

Hereinafter, a configuration for transmission and reception of wake up-DCI will be described. All or part of the following items may be used for wake up-DCI transmission/reception, and all or part of the contents of each item may be included in the wake up signal related configuration.

Hereinafter, an example of wake up-DCI reception based on the configuration for wake up-DCI transmission/reception will be described.

For example, when receiving wake up-DCI in a resource or occasion based on a configuration for the wake up signal and/or wake up-DCI transmission/reception, the UE may operate as follows.

The UE may monitor a set of PDCCH candidates in one or more CORESETs on an activated downlink bandwidth part on each activated serving cell configured for PDCCH monitoring according to the corresponding search space sets. Here, monitoring may mean decoding each PDCCH candidate according to the monitored DCI formats.

The set of PDCCH candidates monitored by the UE is defined as a PDCCH search space set. The search space set may be a common search space set (CSS set) or a UE-specific search space set (USS set).

For each downlink bandwidth part configured for the UE in the serving cell, the UE may be provided up to three CORESETs by higher layer signaling. For each CORESET, the UE may be provided parameters such as a CORESET index, a DM-RS scrambling sequence initialization value, a precoder granularity for a plurality of REGs in the frequency domain, a plurality of consecutive symbols, a set of resource blocks, a CCE-to-REG mapping parameter, an antenna port quasi co-location indicating pseudo co-location information of DM-RS antenna port for PDCCH reception in each CORESET, and an indication of the presence or absence of a transmission configuration indication (TCI) field for a specific DCI format.

For each downlink bandwidth part configured for the UE in the serving cell, the UE may be provided up to 10 search space sets by higher layer signaling. For each search space set, the UE may be provided parameters such as a search space set index, a correlation between a search space set and CORESET, a PDCCH monitoring period, a PDCCH monitoring pattern in a slot, a duration of slots indicating a plurality of slots in which the search space set exists, a plurality of PDCCH candidates per CCE aggregation level, and an indication that the search space set is a CSS set or a USS set.

The UE may determine a PDCCH monitoring period on the activated downlink bandwidth part from a PDCCH monitoring period, a PDCCH monitoring offset and a PDCCH monitoring pattern in a slot.

In the above-described example, the higher layer signal may be a configuration for wake up-DCI transmission/reception.

Hereinafter, the field indication for each UE will be described.

The wake up signal may be divided into a UE-specific wake up signal, a group-specific wake up signal, and the link according to the number of UEs receiving the corresponding signal. In the case of the group-based wake up signal, a method of indicating the entire UE group to wake up and a method of indicating only a part of the UE group to wake up may be considered. In the case of the group-specific wake up signal, since a wake up signal operation for a plurality of UEs can be performed with one DCI, it can be effective in terms of resource utilization.

On the other hand, it may not be suitable from the viewpoint of power saving for each terminal to perform different operation in each method by dividing the wake up-DCI transmission/reception, which is introduced for the purpose of power saving, into UE-specific/group-specific methods, etc. Therefore, the present disclosure proposes that the network performs a UE-specific/group-specific wake up signal related operation, and each method is UE-transparently applied to the UE. To this end, the network may indicate some or all of a size of DCI, a starting position and a length of information on the corresponding UE within an information bit of the DCI, a power saving scheme included in the UE information, and the corresponding schemes. In this case, the UE may use only the region allocated to the UE among the decoded DCI information, and the network may allocate the entire DCI to one UE or to a plurality of UEs as needed.

The power saving scheme included in the UE information and related configurations may be indicated in the following methods.

(Option 1-1) Implicit Indication

A type of the power saving scheme and a bit length of each scheme may be defined for each UE information field length by a predefined definition or network configuration. For example, when the network allocates only 1 bit to a specific UE, the corresponding field may mean the presence or absence of wake up in the associated on-duration(s) by the predefined definition or network configuration. When 3 bits are allocated, the first 1 bit may mean wake up, and the remaining 2 bits may mean a minimum K0/K2 value in on-duration by the predefined definition or network configuration. Here, the minimum K0 may mean a slot offset between each PDCCH and a PDSCH scheduled by the corresponding PDCCH.

(Option 1-2) Explicit Indication

The network may notify each UE of the power saving scheme included in the wake up-DCI and field information for each scheme through wake up-DCI related configuration, etc.

Additionally, when indicating a UE-specific field in DCI to each UE, the network may insert a known bit into an area not allocated to any UE, and inform the UE(s) receiving the DCI of the corresponding information using higher layer signaling, etc. The UE may improve decoding performance by using the corresponding information in the decoding process. For example, the network may insert 0 or 1 into bits remaining after setting the bit field for each UE belonging to the UE group, and notify the corresponding information to each UE belonging to the UE group. Alternatively, a bit field that can be assumed to be a known bit (0 or 1) among information bits of the corresponding wake up-DCI may be informed.

In other words, the network may indicate to the UE some or all of a size of wake up-DCI, a start position and length of information related to the UE in the wake up-DCI, and a power saving scheme configured for the UE. Here, for example, if there is an unused area within the wake up-DCI, the network may inform the UE that the area is allocated with a known bit and transmitted. Here, the known bit may mean a bit string commonly known to the network and the UE. By inserting the known bit into the wake up-DCI, decoding efficiency for wake up-DCI of the UE may be improved.

Hereinafter, a method for distinguishing between group-specific wake up-DCI and UE-specific wake up-DCI will be described.

In the above, a method of UE-transparently operating group-specific/UE-specific wake up-DCI for the UE was proposed. A method of operating by distinguishing between group-specific DCI and UE-specific DCI is also possible as follows.

The network may configure a common search space (CSS) and a UE-specific search space (USS) to the UE for wake up-DCI monitoring. Here, monitoring of group-specific wake up-DCI scrambled by PS (power saving)-RNTI for CSS and monitoring of UE-specific wake up-DCI scrambled by C (cell)-RNTI for USS may be predefined or may be indicated by the network. In this case, in CSS, information on as many UEs as possible can be included in single DCI by reducing the amount of information for each UE, and in USS, by including more power saving scheme and information in DCI, active power saving of a corresponding UE can be induced.

Without distinction between CSS and USS, monitoring of both the group-specific wake up-DCI and the UE-specific wake up-DCI in one search space (e.g., CSS) may be indicated. To this end, the network sets the DCI size of the group-specific wake up-DCI and the DCI size of the UE-specific wake up-DCI to be the same, and the group-specific wake up-DCI and the UE-specific wake up-DCI may be distinguished according to PS-RNTI and C-RNTI. As described above, field configuration information, etc. in DCI for each of the group-specific wake up DCI and the UE-specific wake up-DCI may be indicated to each UE by the network. When monitoring group-specific wake up-DCI and UE-specific wake up-DCI in the same search space set at the same time, it may be characteristic that decoding should be performed by classifying the type, field length, and the like of the power saving scheme indicated in the DCI by the RNTI.

Hereinafter, a bandwidth part (BWP) for monitoring a wake up signal will be described.

In the NR system, a plurality of BWPs (up to 4) may exist in each serving cell, and if the currently operating BWP is called an active BWP and the BWP inactivity timer expires, a BWP to be moved may be defined as a default BWP and a BWP operating in initial access may be defined as an initial BWP. In order to define the wake up signal monitoring performed during the DRX operation, the BWP for performing the wake up signal monitoring should be determined first. The present disclosure proposes to determine the BWP in which the wake up signal monitoring is performed in the following methods. One of the methods below may be defined as the wake up signal monitoring BWP, or may be indicated by the network as a wake up signal monitoring BWP determination method.

(Option 2-1) Default BWP

In the case of option 2-1, there is no need to set a CORESET/search space set for monitoring wake up signals for each BWP, and there is an advantage of reducing ambiguity such as an ambiguity about the difference between a BWP recognized by the UE as the wake up signal monitoring BWP and a BWP recognized by the network as the wake up signal monitoring BWP. In addition, the network may configure a small bandwidth and/or a small CORESET to the default BWP in order to reduce power consumption in the wake up signal detection process. When a wake up signal is detected in the default BWP, the CORESET/search space set configured for PDCCH monitoring purposes in the default BWP may be monitored in the on-duration associated with the wake up signal, and the UE may move to a BWP suitable for data transmission/reception by using the existing BWP switching mechanism.

When option 2-1 is applied, if the existing BWP inactivity timer does not reset at the time of monitoring the wake up signal, ambiguity may occur in the operation at the time of monitoring the wake up signal or after detection of the wake up signal. For example, when a wake up signal is detected in the default BWP and the corresponding timer expires after moving from the default BWP to another BWP, there may be a case of moving to the default BWP again.

Therefore, it is desirable to reset the BWP inactivity timer when detecting a wake up signal in the default BWP or when moving to the default BWP for monitoring a wake up signal. This can be applied to cases other than option 2-1, and in general, it may be interpreted that the existing BWP inactivity timer is reset at a time point at which wake up signal monitoring is performed or a time point at which a wake up signal is detected. Alternatively, it may be interpreted that the wake up-DCI is regarded as the same as the normal PDCCH in the active time.

(Option 2-2) Wake Up Signal Monitoring BWP Configured by a Network

The option 2-2 means that a BWP configured aside for wake up signal monitoring by the network or a specific BWP designated by the network among the BWPs configured for the UE is replaced with the default BWP of option 2-1. Operations except for separately designating the BWP by the network may be performed in the same manner as in option 2-1.

(Option 2-3) Active BWP on Wake Up Signal Monitoring Occasion

Option 2-3 means that the active BWP at the time of wake up signal monitoring is considered as the wake up signal monitoring BWP. That is, in a situation where the BWP other than the default BWP is the active BWP, from the viewpoint of the DRX operation, when the wake up signal monitoring need to be performed at the time point when the BWP inactivity timer is not terminated, the corresponding active BWP may be performed as a wake up signal monitoring BWP. To this end, the network may configure resources such as one or more CORESET/search space set for monitoring a wake up signal for each BWP.

Additionally, when it is difficult to predict the traffic pattern of the UE, it may not be suitable to apply the power saving scheme only in the time domain. Therefore, the present disclosure proposes not to apply the power saving scheme by the wake up signal monitoring in a specific BWP, which can be implemented through the wake up signal monitoring resource configuration. For example, in order to adjust a wake up signal related operation without additional signaling, the network may not configure a wake up signal monitoring resource such as CORESET/search space set in a specific BWP. In this case, when the wake up signal monitoring resource is not configured in the active BWP at the time of monitoring the wake up signal, the UE may perform PDCCH monitoring in the corresponding BWP based on the existing DRX operation. Here, the PDCCH monitoring may be PDCCH monitoring based on a CORESET/search space set configured in the corresponding BWP. Meanwhile, this may mean that the network can configure whether to apply the power saving scheme based on the wake up signal through the BWP change.

Hereinafter, CORESET for wake up signal monitoring will be described.

In the NR system, CORESET serves to configure resource information, for example, a frequency domain resource allocation, a CORESET duration, a REG-to-CCE mapping type, a REG bundle size, etc., for a hashing function of the control channel, and the wake up-DCI may also be transmitted/received through the same process as a general PDCCH. Here, the hashing function may refer to a function for determining a candidate for which the UE should perform blind decoding.

Therefore, CORESET for wake up-DCI monitoring should be configured, and the following methods are proposed in the present disclosure.

The network may indicate one or more CORESETs for the purpose of monitoring the wake up signal, and each CORESET configuration may be indicated in the following methods. The network may indicate wake up signal monitoring CORESET using some or all of the following methods.

In addition, the existing PDCCH CORESET could only be configured at a maximum of three per BWP, which has the purpose of limiting operations such as measurement, tracking, etc. required for the UE to maintain each CORESET when the number of CORESETs increases. On the other hand, since the wake up signal monitoring is differentiated from the general PDCCH monitoring in the time domain, it may be desirable to apply the same restriction as the general CORESET. Therefore, it is desirable to apply a separate restriction to the CORESET for monitoring the wake up signal from the CORESET for general PDCCH monitoring. As an example, a limit on the maximum number of wake up signal monitoring CORESETs (e.g., 2 or 3, etc.) that can be designated for each BWP may be defined. In addition, this may mean that the wake up signal related CORESET is not monitored in a period in which CORESET for general PDCCH monitoring is monitored (e.g., active time in DRX operation).

(Option 3-1) Separate CORESET Configuration for Wake Up Signal Monitoring

Option 3-1 means that the CORESET for the wake up signal monitoring (or, the wake up signal monitoring CORESET) is configured to be the same as the CORESET for the existing PDCCH monitoring. For example, referring to FIG. 9, when CORESETs for PDCCH monitoring are configured to the UE as shown in FIG. 9, the CORESET for monitoring the wake up signal of the UE may be configured to CORESET(s) other than the first CORESET, the second CORESET, and the third CORESET of FIG. 9.

(Option 3-2) Separate CORESET Configuration for Wake Up Signal Monitoring and TCI Linkage Option 3-1 may be inefficient from a viewpoint of a beam management. In general, the TCI of the wake up signal monitoring CORESET may be configured similarly to the TCI of the CORESET(s) configured in the wake up signal monitoring BWP, and this may mean that when the TCI of the PDCCH monitoring CORESET is changed according to a beam management result in an active time, etc., the TCI of the wake up signal monitoring CORESET must also be changed. This may mean that if the TCI update occurs frequently within the active time, unnecessary reconfiguration such as the wake up signal CORESET TCI has to be performed.

In order to overcome this disadvantage, the present disclosure proposes that the TCI of wake up signal monitoring CORESET is linked to the TCI of the PDCCH monitoring CORESET configured in the corresponding BWP. The linkage method may be considered as follows.

(Method 1) Explicit TCI Determination

The network may configure the TCI of PDCCH monitoring CORESET to which the TCI of each wake up signal monitoring CORESET must follow.

(Method 2) Implicit TCI Determination

A rule for determining the PDCCH monitoring CORESET to which the TCI of the wake up signal monitoring CORESET is to be linked may be applied by a predefined definition or an indication of the network. For example, it may be predefined that the wake up signal monitoring CORESET follows the TCI of the CORESET that is monitored at the closest point among the CORESETs monitored in the associated on-duration. As another example, the TCI of the CORESET with the lowest or highest CORESET ID (or the search space set ID associated with CORESET) among CORESETs monitored in the associated on-duration may be recognized as the TCI of the wake up signal monitoring TCI. Similarly, if there are multiple CORESETs linked to CSSs or CSSs among CORESETs monitored in the linked on-duration, a TCI of the CORESET having a lowest CORESET ID among the CORESETs linked to the CSS of the lowest ID, or among the CORESETs linked to the CSS may be regarded as the TCI of the wake up signal monitoring CORESET. When method 2 is applied, signaling overhead may be reduced since the TCI of the wake up signal monitoring CORESET can be adapted without additional signaling to change the TCI of the PDCCH monitoring CORESET. Also, since the TCI applied at the active time is applied, more accurate wake up signal transmission/reception by the TCI may be expected.

(Option 3-3) Selection of CORESET for PDCCH Monitoring

The network may indicate one or more of the CORESETs configured for PDCCH monitoring to be used as a wake up signal monitoring CORESET. For example, referring to FIG. 9, when the first CORESET, the second CORESET and the third CORESET are configured to the UE, one or more CORESETs among the first CORESET, the second CORESET and the third CORESET may be configured as the wake up signal monitoring CORESET by the network.

Hereinafter, beam management in the DRX OFF duration will be described.

When the DRX operation and the wake up-DCI monitoring indicating whether to monitor the PDCCH are configured together, the length of the interval in which the UE does not perform the PDCCH monitoring may be significantly increased compared to the existing DRX operation. Here, maintaining measurement and reporting of beam-related measurement and report and cell-related measurement and report indicated in the existing DRX operation in the corresponding duration may be inappropriate in terms of power saving or beam management. For example, if the measurement report is configured frequently, it may be desirable for a UE that does not monitor PDCCH in multiple DRX cycles to reduce power consumption by reporting, and configuring a measurement period and a report period for appropriate beam management based on a traffic pattern of the UE may be effective for link and beam management. In order to solve this problem, the present disclosure proposes to separately configure a measurement report configuration in the DRX off duration when DRX operation is configured and/or when DRX operation and wake up-DCI monitoring are configured at the same time. The UE may perform the measurement report in the active time according to a measurement report configuration for the active time, and may perform the measurement report in a period other than the active time according to the measurement report configuration of the separately configured DRX OFF period. That is, within a time duration in which the on-duration timer is not in operation, the UE may perform operations such as measurement, reporting, etc. based on a separate configuration.

Separately from the above, the UE may request the network to stop the DRX operation and/or the wake up-DCI monitoring operation. In general, PDCCH monitoring is not performed in the DRX OFF duration, that is, in the duration other than the active time in the DRX operation, and this means that operations such as beam change, CORESET/search space set reconfiguration, etc. by the network cannot be performed during the DRX OFF duration. In this case, unnecessary operations such as beam failure may be performed when the DRX cycle is large. Therefore, according to the proposal of the present disclosure, the UE may request the network to stop the DRX operation and/or the wake up-DCI monitoring operation, and the network receiving the request may perform beam management for the corresponding UE and reconfiguration for data channel/control channel.

Hereinafter, a fallback operation will be described.

If blind decoding is performed for wake up-DCI at the wake up signal monitoring occasion indicated by the network, but no wake up signal is detected, the corresponding UE may not distinguish whether the detection failure of the wake up signal occurs because the network did not transmit the wake up-DCI or because the network transmitted the wake up-DCI but the decoding is failed due to the channel environment or the like. In particular, when the network transmitted the wake up-DCI but the UE failed to decode, side effects such as throughput loss, latency increase, etc. may occur depending on the subsequent operation of the corresponding UE. In order to solve such problems, the present disclosure proposes an operation of a UE when the UE fails to detect a wake up signal in a wake up signal monitoring occasion.

(Type a Fallback Operation) PDCCH Monitoring Performed in On-Duration Associated with the Corresponding Wake Up Signal Monitoring Occasion PDCCH monitoring performed by the type A fallback operation may be performed on all CORESET/search space sets configured for the corresponding on-duration, or may be performed only on a specified CORESET/search space set (e.g., CSS, search space monitoring fallback DCI, etc.). This may be determined based on predefined definition or a CORESET/search space set to be monitored in the type A fallback operation may be indicated by the network configuration.

(Type B Fallback Operation) PDCCH Operation is not Performed in On-Duration Associated with the Corresponding Wake Up Signal Monitoring Occasion.

According to the type B fallback operation, the UE may not perform PDCCH monitoring in the on-duration associated with the corresponding wake up signal monitoring occasion.

Hereinafter, selection of a search space set for an exceptional case will be described.

In NR, the wake up indication may indicate whether to perform PDCCH monitoring in the DRX cycle associated with the DCI (this is called wake up-DCI.) including the indication and the on-duration of the DRX cycle. The UE indicated to 'wake up' by the wake up indication may perform monitoring on a monitoring occasion of the search space set indicated by the search space set configuration for the associated DRX on-duration, and the UE indicated to 'sleep' may maintain the sleep operation until the next wake up signal monitoring occasion without performing PDCCH monitoring in the associated DRX on-duration.

Meanwhile, for smooth communication between the network and the UE, an operation that can be performed during sleep may be defined, and the following cases may exist. Meanwhile, hereinafter, DCI format 3_0 may refer to a DCI format that delivers a wake up indication other than an activation time, SCell dormancy indication, and the like.

(case 1) The UE may transmit a scheduling request (SR), and despite the indication of DCI format 3_0, the UE may expect to receive a PDCCH scheduling PDSCH after transmission of a positive SR, when the UE determines that uplink transmission is necessary, the UE may transmit a scheduling request to the network, and then may perform PDCCH monitoring to receive uplink scheduling DCI.

(case 2) Despite the indication of DCI format 3_0, the UE may expect to receive a PDCCH scheduling SPS-PDSCH retransmission after transmitting a NACK during the DRX cycle. The UE may receive a semi-persistent scheduled PDSCH, regarding the SPS PDSCH when the UE transmits NACK for the PDCCH, the network may transmit the PDCCH for retransmission resource configuration, etc., and monitoring for the corresponding PDCCH may be performed regardless of whether the wake up occurs.

Additionally, for case 2, activation/deactivation for the SPS PDSCH may also be transmitted on the PDCCH. However, when wake up is not indicated to the UE, since monitoring of the corresponding PDCCH is not performed, there may be a problem that activation of the SPS PDSCH may not be indicated. In order to solve such a problem, the present disclosure proposes that the network may indicate PDCCH monitoring for a specific RNTI or a specific search space during a sleep operation or a specific duration (for example, an area indicated as on-duration in the DRX configuration, but in which a sleep operation is indicated by a wake up indication) during a sleep operation. Here, that is, in PDCCH monitoring in the sleep duration, the monitoring configuration of the corresponding RNTI or a search space set may be indicated separately from the active time. For example, for the search space set indicated to monitor the CS-RNTI, monitoring may be indicated based on a monitoring period of 2 ms in the active time and 10 ms in the sleep duration. Also, when there are a plurality of search space sets indicated to monitor the same RNTI, monitoring of all or part of the corresponding search space sets may be indicated.

(case 3) The UE may expect to receive PDCCH for at least the recovery of the search space set in response to the PRACH transmission during the DRX cycle despite the indication of the DCI format 3_0. In order to determine whether the beam has failed, the UE may receive a reference signal for beam failure monitoring from the network. If the reception performance of the corresponding reference signal is less than the reference value, it is determined as a beam failure and a beam failure recovery operation may be performed. Here, the RACH procedure based on the newly selected beam based on the reception performance may be performed, and the UE that has transmitted the RACH needs to monitor the PDCCH corresponding to the response to the RACH, and this may be performed regardless of whether the UE wakes up or not.

In the situation presented above, the NR and LTE systems up to now use a method of inducing PDCCH monitoring by starting the active time. This may mean that unnecessary PDCCH monitoring (e.g., monitoring for irrelevant DCI/RNTI) is performed in view of power saving. In order to solve this problem, the present disclosure proposes to apply one or a combination of two or more of the following methods to efficiently perform PDCCH monitoring in a situation in which wake up is not indicated as above. Each of the options below may be implemented through a combination of all options or a combination of some of the contents of each option. In addition to the cases presented above, the proposal may be applied to a situation in which a sleep operation is indicated but PDCCH monitoring needs to be performed. In the present disclosure, a search space set not indicated to be monitored by the options below may mean not monitored in the corresponding situation. Also, different options may be applied to each case (not only the cases presented above but also other cases in which PDCCH monitoring is performed in the sleep duration).

(Option 4-1) a Search Space Set Related to Monitoring

The UE may perform monitoring on the entire search space set linked in each case. For example, scheduling DCI for retransmission, uplink transmission for SR, etc. may be monitored in the USS for monitoring the fallback DCI, the USS for monitoring the non-fallback DCI, and CSS(s) indicated/designated to monitor the C-RNTI. Option 4-1 may mean performing PDCCH monitoring for all search space sets indicated to monitor the associated RNTI for each case. Additionally, when there are a plurality of RNTIs indicated to be monitored in each search space set, actual monitoring may be performed only for the RNTIs associated with the corresponding situation. Also, option 4-1 may be interpreted as indicating not to perform monitoring for a specific search space set or a specific RNTI. For example, the network may indicate that CSS is not monitored for case 1 and case 2 above.

(Option 4-2) a Search Space Set Related to Monitoring Configured by the Network

In order to reduce the PDCCH monitoring complexity of option 4-1, the network may indicate in advance one or more search space sets to which the configuration proposed in the present disclosure may be applied among the search space sets indicated to monitor a specific RNTI. For example, if the C-RNTI is to be monitored by case 1 or case 2 above, and if there are multiple search space sets (e.g., USS for non-fallback DCI, USS for fallback DCI) previously indicated to monitor C-RNTI, the network may indicate in advance a search space set (e.g., USS for fallback DCI) on which actual monitoring should be performed.

(Option 4-3) Monitoring of the Search Space Set Configured by the Network

Option 4-3 refers to a method in which the network separately indicates a search space set to be monitored when PDCCH monitoring is performed in the sleep duration. That is, as in the above case, the network may indicate a separate search space set configuration for a case where monitoring is required even in the sleep duration, and the corresponding search space set may not be monitored when the UE wakes up by a wake up indication.

Figure 22:
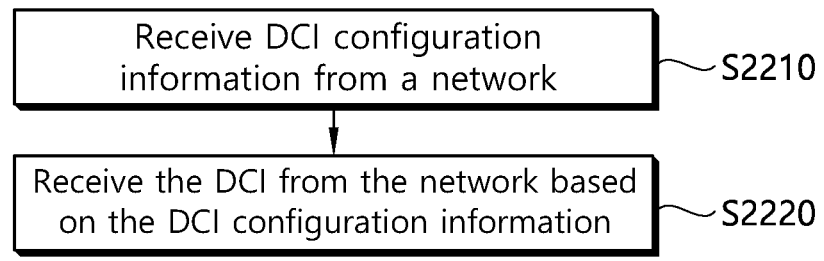
FIG. 22 is a flowchart of an example of a method for receiving downlink control information (DCI) of a UE according to the present disclosure.

FIG. 22 is a flowchart of an example of a method for receiving downlink control information (DCI) of a UE according to the present disclosure.

Referring to FIG. 22, the UE receives DCI configuration information from a network (S2210).

Thereafter, the UE receives the DCI from the network based on the DCI configuration information (S2220).

Here, the DCI may include a first field and a second field. Also, the first field may be an area to which information on the UE is allocated. Also, the second field may be an area to which information on the UE is not allocated. Also, the DCI configuration information may inform a size of the DCI and a start position of the first field. Also, the DCI configuration information may inform a beat stream corresponding to the second field. The bit stream may be a known bit for the network and the UE.

Figure 23:
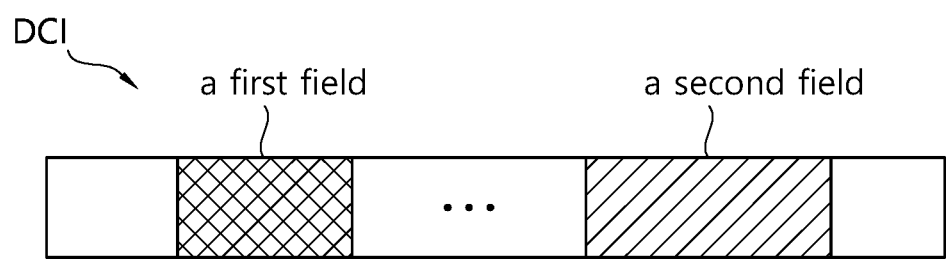
FIG. 23 schematically illustrates an example to which the method of FIG. 22 is applied.

FIG. 23 schematically illustrates an example to which the method of FIG. 22 is applied.

Referring to FIG. 23, the UE of FIG. 22 may receive the DCI. Here, the DCI may include a first field and a second field.

Here, for example, when the first field is an area including information on the UE, the second field may be an area that does not include information on the UE. That is, the second field may be an area including information on a UE other than the UE. In this case, the UE may know a size of the DCI and a start position of the first field in the DCI through the DCI configuration information transmitted from the network.

Also, as an example, DCI configuration information may include information on a beat stream allocated to the second field or a bit stream corresponding to the second field. That is, the bit stream may be a known bit. In this case, the UE may perform decoding for the DCI using the bit stream or the known bit.

The claims described herein may be combined in various ways. For example, the technical features of the method claims of the present disclosure may be combined and implemented as an apparatus, and the technical features of the apparatus claims of the present disclosure may be combined and implemented as a method. In addition, the technical features of the method claim of the present disclosure and the technical features of the apparatus claim may be combined to be implemented as an apparatus, and the technical features of the method claim of the present disclosure and the technical features of the apparatus claim may be combined and implemented as a method.

In addition to the terminal, the methods proposed in the present disclosure may be performed by at least one computer-readable medium including instructions based on being executed by at least one processor, and by an apparatus configured to control the terminal including at least one processor and at least one memory executably connected by the at least one processor and storing instructions, which executes the instructions to perform the methods proposed in the present disclosure. Also, it is obvious that, according to the methods proposed in this specification, an operation by the base station corresponding to the operation performed by the terminal may be considered.

Hereinafter, an example of a communication system to which the disclosure is applied is described.

Various descriptions, functions, procedures, proposals, methods, and/or operational flowcharts disclosed herein may be applied to, but not limited to, various fields requiring wireless communication/connection (e.g., 5G) between devices.

Hereinafter, specific examples are illustrated with reference to drawings. In the following drawings/description, unless otherwise indicated, like reference numerals may refer to like or corresponding hardware blocks, software blocks, or functional blocks.

Figure 24:
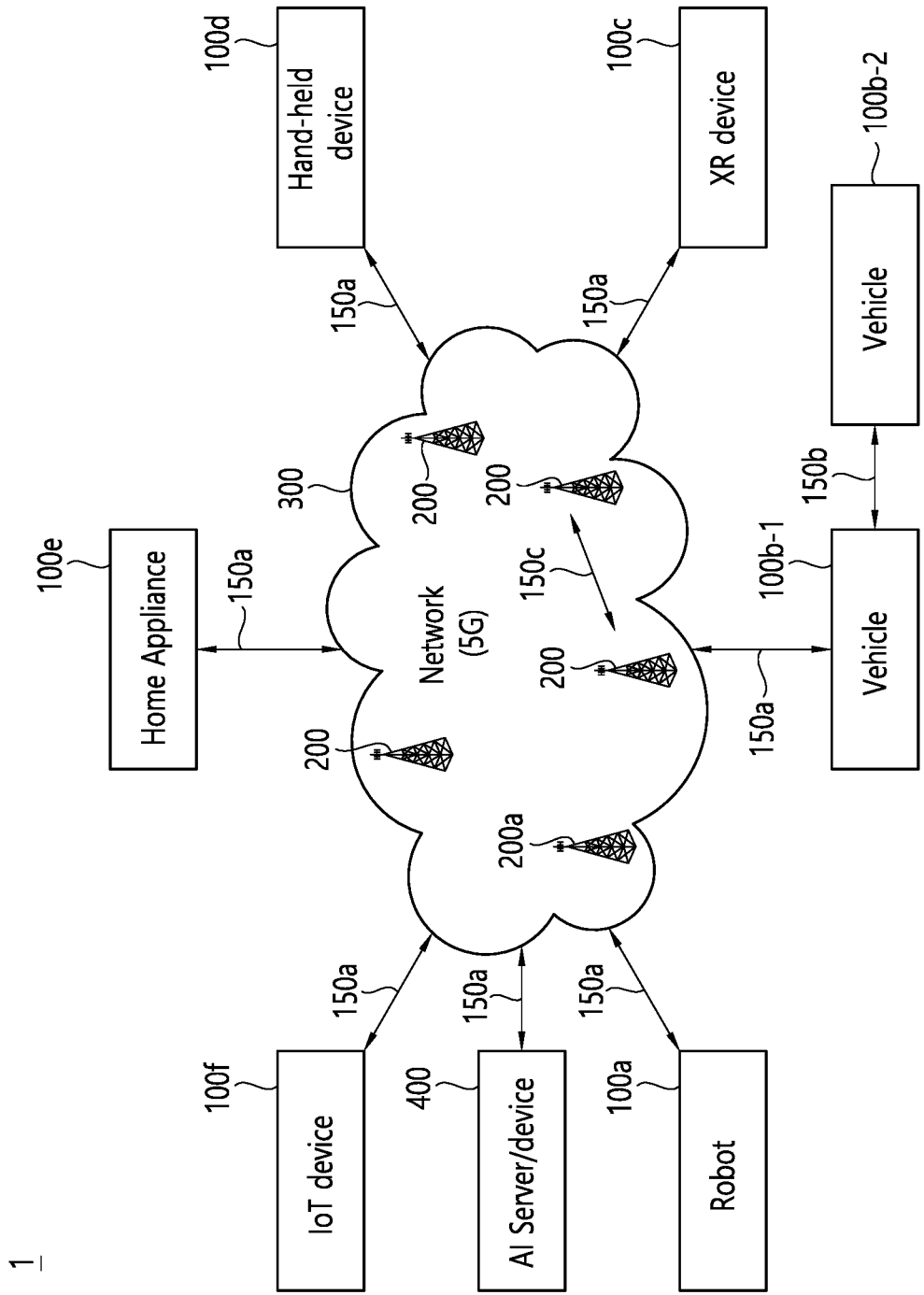
FIG. 24 illustrates a communication system 1 applied to the disclosure.

FIG. 24 illustrates a communication system 1 applied to the disclosure.

Referring to FIG. 24, the communication system 1 applied to the disclosure includes a wireless device, a base station, and a network. Here, the wireless device refers to a device that performs communication using a radio access technology (e.g., 5G new RAT (NR) or Long-Term Evolution (LTE)) and may be referred to as a communication/wireless/5G device. The wireless device may include, but limited to, a robot 100a, a vehicle 100b-1 and 100b-2, an extended reality (XR) device 100c, a hand-held device 100d, a home appliance 100e, an Internet of things (IoT) device 100f, and an AI device/server 400. For example, the vehicle may include a vehicle having a wireless communication function, an autonomous driving vehicle, a vehicle capable of inter-vehicle communication, or the like. Here, the vehicle may include an unmanned aerial vehicle (UAV) (e.g., a drone). The XR device may include augmented reality (AR)/virtual reality (VR)/mixed reality (MR) devices and may be configured as a head-mounted device (HMD), a vehicular head-up display (HUD), a television, a smartphone, a computer, a wearable device, a home appliance, digital signage, a vehicle, a robot, or the like. The hand-held device may include a smartphone, a smartpad, a wearable device (e.g., a smart watch or smart glasses), and a computer (e.g., a notebook). The home appliance may include a TV, a refrigerator, a washing machine, and the like. The IoT device may include a sensor, a smart meter, and the like. The base station and the network may be configured, for example, as wireless devices, and a specific wireless device 200a may operate as a base station/network node for other wireless devices.

The wireless devices 100a to 100f may be connected to the network 300 through the base station 200. Artificial intelligence (AI) technology may be applied to the wireless devices 100a to 100f, and the wireless devices 100a to 100f may be connected to an AI server 400 through the network 300. The network 300 may be configured using a 3G network, a 4G (e.g., LTE) network, or a 5G (e.g., NR) network. The wireless devices 100a to 100f may communicate with each other via the base station 200/network 300 and may also perform direct communication (e.g. sidelink communication) with each other without passing through the base station/network. For example, the vehicles 100b-1 and 100b-2 may perform direct communication (e.g. vehicle-to-vehicle (V2V)/vehicle-to-everything (V2X) communication). Further, the IoT device (e.g., a sensor) may directly communicate with another IoT device (e.g., a sensor) or another wireless device 100a to 100f.

Wireless communications/connections 150a, 150b, and 150c may be established between the wireless devices 100a to 100f and the base station 200 and between the base stations 200. Here, the wireless communications/connections may be established by various wireless access technologies (e.g., 5G NR), such as uplink/downlink communication 150a, sidelink communication 150b (or D2D communication), and inter-base station communication 150c (e.g., relay or integrated access backhaul (IAB)). The wireless devices and the base station/wireless devices, and the base stations may transmit/receive radio signals to/from each other through the wireless communications/connections 150a, 150b, and 150c. For example, the wireless communications/connections 150a, 150b, and 150c may transmit/receive signals over various physical channels. To this end, at least some of various configuration information setting processes, various signal processing processes (e.g., channel encoding/decoding, modulation/demodulation, resource mapping/demapping, and the like), and resource allocation processes may be performed on the basis of various proposals of the disclosure.

Figure 25:
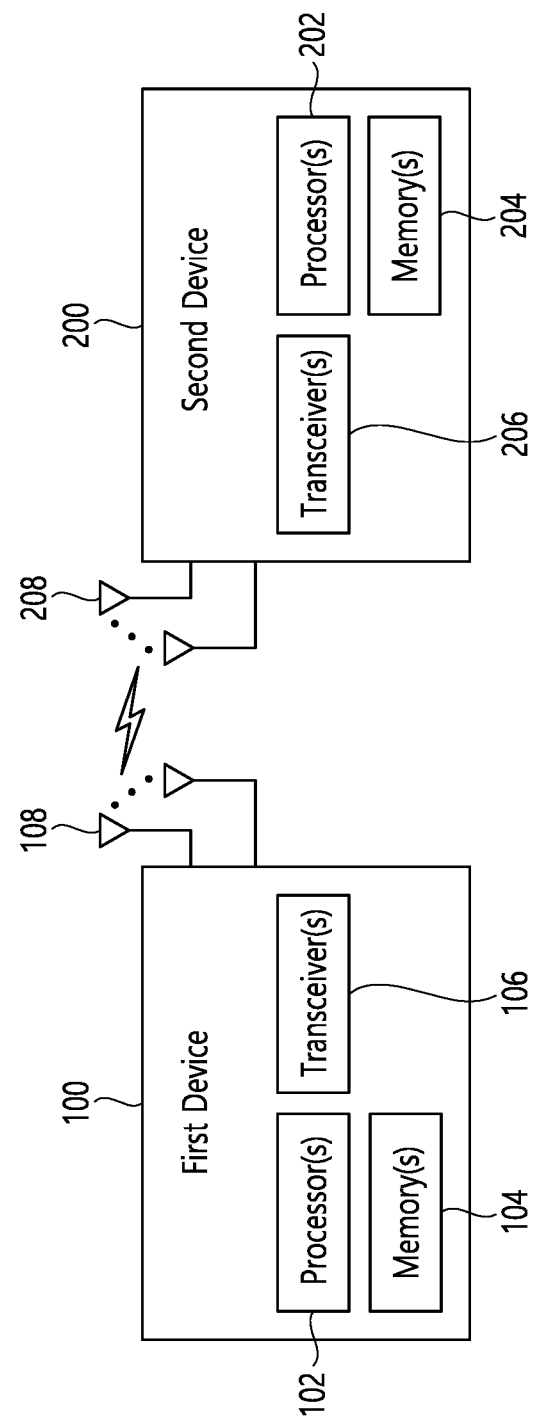
FIG. 25 illustrates a wireless device that is applicable to the disclosure.

FIG. 25 illustrates a wireless device that is applicable to the disclosure.

Referring to FIG. 25, a first wireless device 100 and a second wireless device 200 may transmit and receive radio signals through various radio access technologies (e.g., LTE and NR). Here, the first wireless device 100 and the second wireless device 200 may respectively correspond to a wireless device 100x and the base station 200 of FIG. 24 and/or may respectively correspond to a wireless device 100x and a wireless device 100x of FIG. 24.

The first wireless device 100 includes at least one processor 102 and at least one memory 104 and may further include at least one transceiver 106 and/or at least one antenna 108. The processor 102 may be configured to control the memory 104 and/or the transceiver 106 and to implement the descriptions, functions, procedures, proposals, methods, and/or operational flowcharts disclosed herein. For example, the processor 102 may process information in the memory 104 to generate first information/signal and may then transmit a radio signal including the first information/signal through the transceiver 106. In addition, the processor 102 may receive a radio signal including second information/signal through the transceiver 106 and may store information obtained from signal processing of the second information/signal in the memory 104. The memory 104 may be connected to the processor 102 and may store various pieces of information related to the operation of the processor 102. For example, the memory 104 may store a software code including instructions to perform some or all of processes controlled by the processor 102 or to perform the descriptions, functions, procedures, proposals, methods, and/or operational flowcharts disclosed herein. Here, the processor 102 and the memory 104 may be part of a communication modem/circuit/chip designed to implement a radio communication technology (e.g., LTE or NR). The transceiver 106 may be connected with the processor 102 and may transmit and/or receive a radio signal via the at least one antennas 108. The transceiver 106 may include a transmitter and/or a receiver. The transceiver 106 may be replaced with a radio frequency (RF) unit. In the disclosure, the wireless device may refer to a communication modem/circuit/chip.

The second wireless device 200 includes at least one processor 202 and at least one memory 204 and may further include at least one transceiver 206 and/or at least one antenna 208. The processor 202 may be configured to control the memory 204 and/or the transceiver 206 and to implement the descriptions, functions, procedures, proposals, methods, and/or operational flowcharts disclosed herein. For example, the processor 202 may process information in the memory 204 to generate third information/signal and may then transmit a radio signal including the third information/signal through the transceiver 206. In addition, the processor 202 may receive a radio signal including fourth information/signal through the transceiver 206 and may store information obtained from signal processing of the fourth information/signal in the memory 204. The memory 204 may be connected to the processor 202 and may store various pieces of information related to the operation of the processor 202. For example, the memory 204 may store a software code including instructions to perform some or all of processes controlled by the processor 202 or to perform the descriptions, functions, procedures, proposals, methods, and/or operational flowcharts disclosed herein. Here, the processor 202 and the memory 204 may be part of a communication modem/circuit/chip designed to implement a radio communication technology (e.g., LTE or NR). The transceiver 206 may be connected with the processor 202 and may transmit and/or receive a radio signal via the at least one antennas 208. The transceiver 206 may include a transmitter and/or a receiver. The transceiver 206 may be replaced with an RF unit. In the disclosure, the wireless device may refer to a communication modem/circuit/chip.

Hereinafter, hardware elements of the wireless devices 100 and 200 are described in detail. At least one protocol layer may be implemented, but limited to, by the at least one processor 102 and 202. For example, the at least one processor 102 and 202 may implement at least one layer (e.g., a functional layer, such as PHY, MAC, RLC, PDCP, RRC, and SDAP layers). The at least one processor 102 and 202 may generate at least one protocol data unit (PDU) and/or at least one service data unit (SDU) according to the descriptions, functions, procedures, proposals, methods, and/or operational flowcharts disclosed herein. The at least one processor 102 and 202 may generate a message, control information, data, or information according to the descriptions, functions, procedures, proposals, methods, and/or operational flowcharts disclosed herein. The at least one processor 102 and 202 may generate a signal (e.g., a baseband signal) including a PDU, an SDU, a message, control information, data, or information according to the functions, procedures, proposals, and/or methods disclosed herein and may provide the signal to the at least one transceiver 106 and 206. The at least one processor 102 and 202 may receive a signal (e.g., a baseband signal) from the at least one transceiver 106 and 206 and may obtain a PDU, an SDU, a message, control information, data, or information according to the descriptions, functions, procedures, proposals, methods, and/or operational flowcharts disclosed herein.

The at least one processor 102 and 202 may be referred to as a controller, a microcontroller, a microprocessor, or a microcomputer. The at least one processor 102 and 202 may be implemented by hardware, firmware, software, or a combination thereof. For example, at least one application-specific integrated circuit (ASIC), at least one digital signal processor (DSP), at least one digital signal processing devices (DSPD), at least one programmable logic devices (PLD), or at least one field programmable gate array (FPGA) may be included in the at least one processor 102 and 202. The descriptions, functions, procedures, proposals, methods, and/or operational flowcharts disclosed herein may be implemented using firmware or software, and the firmware or software may be configured to include modules, procedures, functions, and the like. The firmware or software configured to perform the descriptions, functions, procedures, proposals, methods, and/or operational flowcharts disclosed herein may be included in the at least one processor 102 and 202 or may be stored in the at least one memory 104 and 204 and may be executed by the at least one processor 102 and 202. The descriptions, functions, procedures, proposals, methods, and/or operational flowcharts disclosed herein may be implemented in the form of a code, an instruction, and/or a set of instructions using firmware or software.

The at least one memory 104 and 204 may be connected to the at least one processor 102 and 202 and may store various forms of data, signals, messages, information, programs, codes, indications, and/or commands. The at least one memory 104 and 204 may be configured as a ROM, a RAM, an EPROM, a flash memory, a hard drive, a register, a cache memory, a computer-readable storage medium, and/or a combinations thereof. The at least one memory 104 and 204 may be disposed inside and/or outside the at least one processor 102 and 202. In addition, the at least one memory 104 and 204 may be connected to the at least one processor 102 and 202 through various techniques, such as a wired or wireless connection.

The at least one transceiver 106 and 206 may transmit user data, control information, a radio signal/channel, or the like mentioned in the methods and/or operational flowcharts disclosed herein to at least different device. The at least one transceiver 106 and 206 may receive user data, control information, a radio signal/channel, or the like mentioned in the descriptions, functions, procedures, proposals, methods, and/or operational flowcharts disclosed herein from at least one different device. For example, the at least one transceiver 106 and 206 may be connected to the at least one processor 102 and 202 and may transmit and receive a radio signal. For example, the at least one processor 102 and 202 may control the at least one transceiver 106 and 206 to transmit user data, control information, or a radio signal to at least one different device. In addition, the at least one processor 102 and 202 may control the at least one transceiver 106 and 206 to receive user data, control information, or a radio signal from at least one different device. The at least one transceiver 106 and 206 may be connected to the at least one antenna 108 and 208 and may be configured to transmit or receive user data, control information, a radio signal/channel, or the like mentioned in the descriptions, functions, procedures, proposals, methods, and/or operational flowcharts disclosed herein through the at least one antenna 108 and 208. In this document, the at least one antenna may be a plurality of physical antennas or may be a plurality of logical antennas (e.g., antenna ports). The at least one transceiver 106 and 206 may convert a received radio signal/channel from an RF band signal into a baseband signal in order to process received user data, control information, a radio signal/channel, or the like using the at least one processor 102 and 202. The at least one transceiver 106 and 206 may convert user data, control information, a radio signal/channel, or the like, processed using the at least one processor 102 and 202, from a baseband signal to an RF bad signal. To this end, the at least one transceiver 106 and 206 may include an (analog) oscillator and/or a filter.

Figure 26:
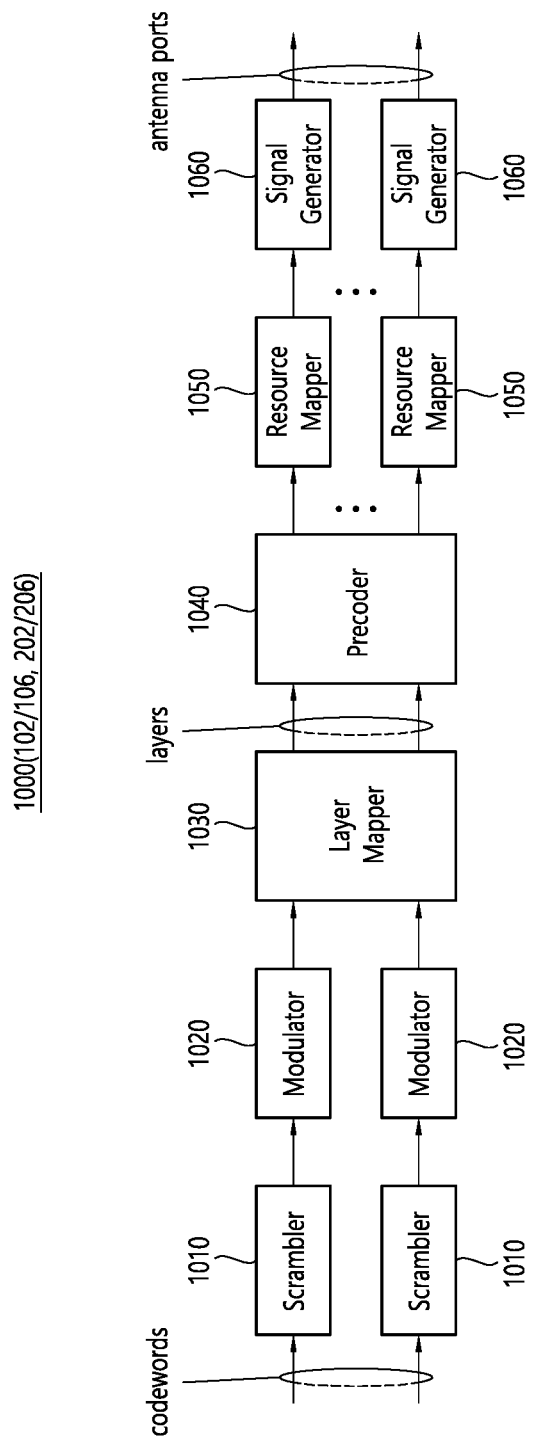
FIG. 26 illustrates a signal processing circuit for a transmission signal.

FIG. 26 illustrates a signal processing circuit for a transmission signal.

Referring to FIG. 26, the signal processing circuit 1000 may include a scrambler 1010, a modulator 1020, a layer mapper 1030, a precoder 1040, a resource mapper 1050, and a signal generator 1060. Operations/functions illustrated with reference to FIG. 26 may be performed, but not limited to, in the processor 102 and 202 and/or the transceiver 106 and 206 of FIG. 25. Hardware elements illustrated in FIG. 26 may be configured in the processor 102 and 202 and/or the transceiver 106 and 206 of FIG. 25. For example, blocks 1010 to 1060 may be configured in the processor 102 and 202 of FIG. 25. Alternatively, blocks 1010 to 1050 may be configured in the processor 102 and 202 of FIG. 25, and a block 1060 may be configured in the transceiver 106 and 206 of FIG. 25.

A codeword may be converted into a radio signal via the signal processing circuit 1000 of FIG. 26. Here, the codeword is an encoded bit sequence of an information block. The information block may include a transport block (e.g., a UL-SCH transport block and a DL-SCH transport block). The radio signal may be transmitted through various physical channels (e.g., a PUSCH or a PDSCH).

Specifically, the codeword may be converted into a scrambled bit sequence by the scrambler 1010. A scrambled sequence used for scrambling is generated on the basis of an initialization value, and the initialization value may include ID information about a wireless device. The scrambled bit sequence may be modulated into a modulation symbol sequence by the modulator 1020. A modulation scheme may include pi/2-binary phase shift keying (pi/2-BPSK), m-phase shift keying (m-PSK), m-quadrature amplitude modulation (m-QAM), and the like. A complex modulation symbol sequence may be mapped to at least one transport layer by the layer mapper 1030. Modulation symbols of each transport layer may be mapped to a corresponding antenna port(s) by the precoder 1040 (precoding). Output z from the precoder 1040 may be obtained by multiplying output y from the layer mapper 1030 by a precoding matrix W of N*M, where N is the number of antenna ports, and M is the number of transport layers. Here, the precoder 1040 may perform precoding after performing transform precoding (e.g., DFT transform) on complex modulation symbols. Alternatively, the precoder 1040 may perform precoding without performing transform precoding.

The resource mapper 1050 may map a modulation symbol of each antenna port to a time-frequency resource. The time-frequency resource may include a plurality of symbols (e.g., CP-OFDMA symbols or DFT-s-OFDMA symbols) in the time domain and may include a plurality of subcarriers in the frequency domain. The signal generator 1060 may generate a radio signal from mapped modulation symbols, and the generated radio signal may be transmitted to another device through each antenna. To this end, the signal generator 1060 may include an inverse fast Fourier transform (IFFT) module, a cyclic prefix (CP) inserter, a digital-to-analog converter (DAC), a frequency upconverter, and the like.

A signal processing procedure for a received signal in a wireless device may be performed in the reverse order of the signal processing procedure 1010 to 1060 of FIG. 26. For example, a wireless device (e.g., 100 and 200 of FIG. 25) may receive a radio signal from the outside through an antenna port/transceiver. The received radio signal may be converted into a baseband signal through a signal reconstructor. To this end, the signal reconstructor may include a frequency downconverter, an analog-to-digital converter (ADC), a CP remover, and a fast Fourier transform (FFT) module. The baseband signal may be reconstructed to a codeword through resource demapping, postcoding, demodulation, and descrambling. The codeword may be reconstructed to an original information block through decoding. Thus, a signal processing circuit (not shown) for a received signal may include a signal reconstructor, a resource demapper, a postcoder, a demodulator, a descrambler and a decoder.

Figure 27:
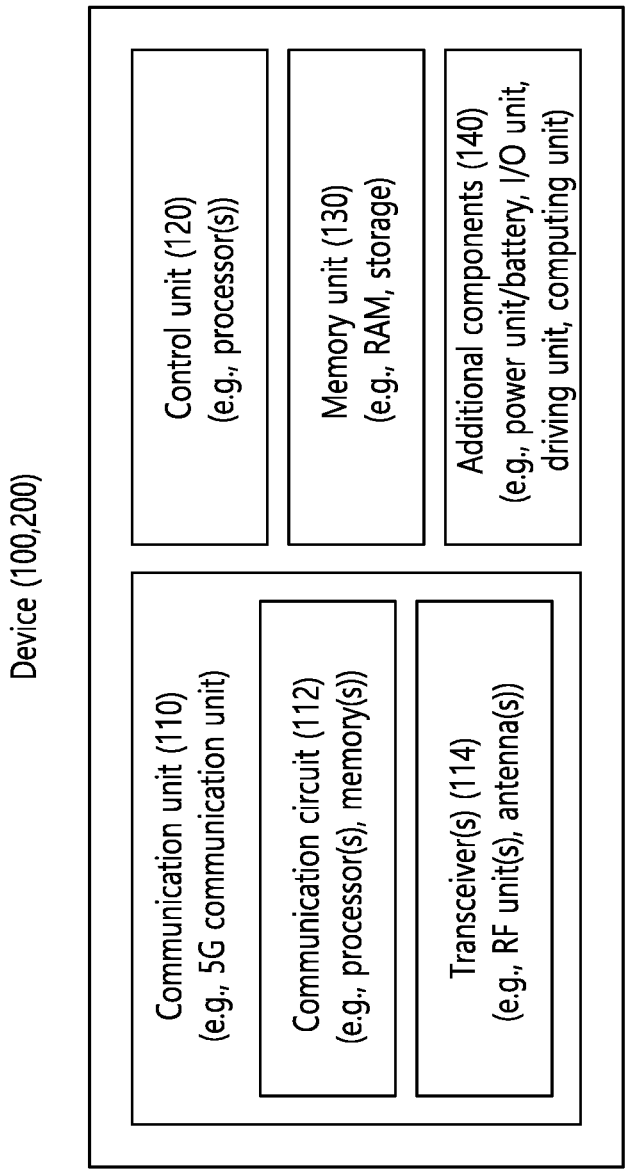
FIG. 27 illustrates another example of a wireless device applied to the disclosure.

FIG. 27 illustrates another example of a wireless device applied to the disclosure. The wireless device may be configured in various forms depending on usage/service.

Referring to FIG. 27, the wireless devices 100 and 200 may correspond to the wireless device 100 and 200 of FIG. 25 and may include various elements, components, units, and/or modules. For example, the wireless device 100 and 200 may include a communication unit 110, a control unit 120, a memory unit 130, and additional components 140. The communication unit may include a communication circuit 112 and a transceiver(s) 114. For example, the communication circuit 112 may include the at least one processor 102 and 202 and/or the at least one memory 104 and 204 of FIG. 25. For example, the transceiver(s) 114 may include the at least one transceiver 106 and 206 and/or the at least one antenna 108 and 208 of FIG. 25. The control unit 120 is electrically connected to the communication unit 110, the memory unit 130, and the additional components 140 and controls overall operations of the wireless device. For example, the control unit 120 may control electrical/mechanical operations of the wireless device on the basis of a program/code/command/information stored in the memory unit 130. In addition, the control unit 120 may transmit information stored in the memory unit 130 to the outside (e.g., a different communication device) through a wireless/wired interface via the communication unit 110 or may store, in the memory unit 130, information received from the outside (e.g., a different communication device) through the wireless/wired interface via the communication unit 110.

The additional components 140 may be configured variously depending on the type of the wireless device. For example, the additional components 140 may include at least one of a power unit/battery, an input/output (I/O) unit, a driving unit, and a computing unit. The wireless device may be configured, but not limited to, as a robot (100a in FIG. 24), a vehicle (100 b-1 or 100 b-2 in FIG. 24), an XR device (100 c in FIG. 24), a hand-held device (100 d in FIG. 24), a home appliance (100e in FIG. 24), an IoT device (100f in FIG. 24), a terminal for digital broadcasting, a hologram device, a public safety device, an MTC device, a medical device, a fintech device (or financial device), a security device, a climate/environmental device, an AI server/device (400 in FIG. 24), a base station (200 in FIG. 24), a network node, or the like. The wireless device may be mobile or may be used in a fixed place depending on usage/service.

In FIG. 27, all of the various elements, components, units, and/or modules in the wireless devices 100 and 200 may be connected to each other through a wired interface, or at least some thereof may be wirelessly connected through the communication unit 110. For example, the control unit 120 and the communication unit 110 may be connected via a cable in the wireless device 100 and 200, and the control unit 120 and a first unit (e.g., 130 and 140) may be wirelessly connected through the communication unit 110. In addition, each element, component, unit, and/or module in wireless device 100 and 200 may further include at least one element. For example, the control unit 120 may include at least one processor set. For example, the control unit 120 may be configured as a set of a communication control processor, an application processor, an electronic control unit (ECU), a graphics processing processor, a memory control processor, and the like. In another example, the memory unit 130 may include a random-access memory (RAM), a dynamic RAM (DRAM), a read-only memory (ROM), a flash memory, a volatile memory, a non-volatile memory, and/or a combination thereof.

Next, an illustrative configuration of FIG. 27 is described in detail with reference to the accompanying drawing.

Figure 28:
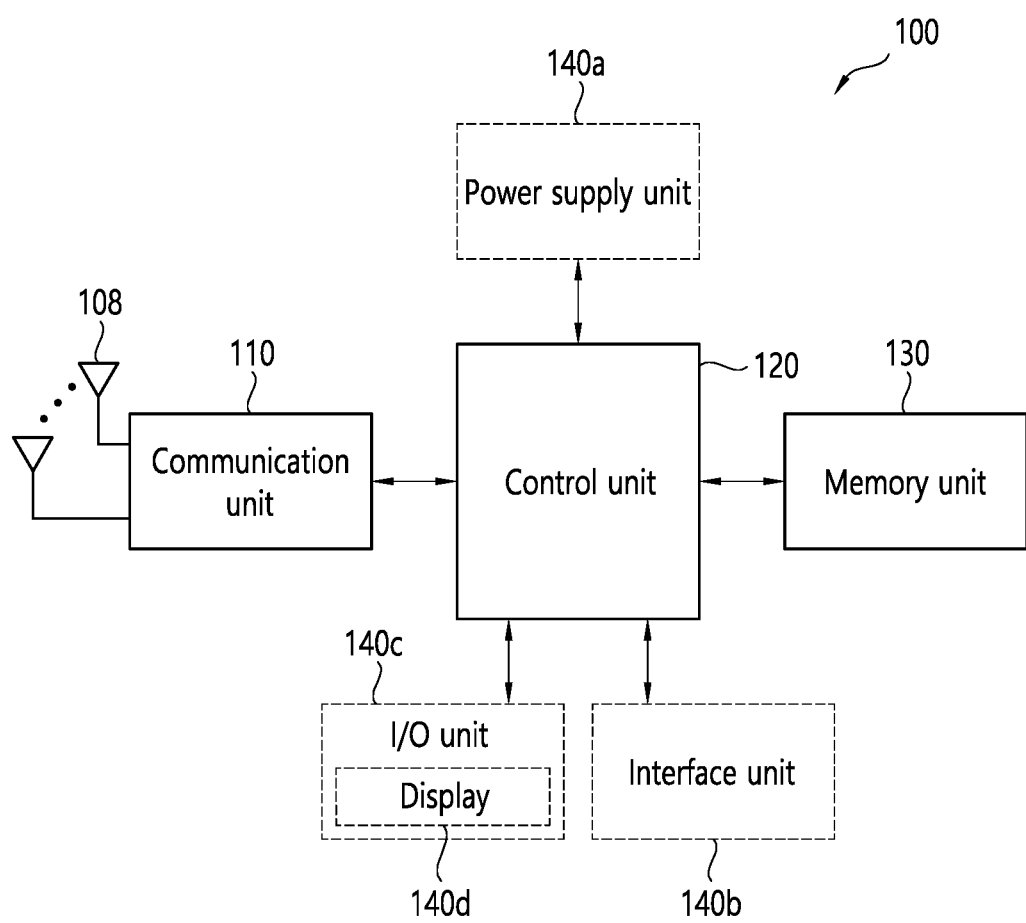
FIG. 28 illustrates a hand-held device applied to the disclosure.

FIG. 28 illustrates a hand-held device applied to the disclosure. The hand-held device may include a smartphone, a smartpad, a wearable device (e.g., a smart watch or smart glasses), and a portable computer (e.g., a notebook). The hand-held device may be referred to as a mobile station (MS), a user terminal (UT), a mobile subscriber station (MSS), a subscriber station (SS), an advanced mobile station (AMS), or a wireless terminal (WT).

Referring to FIG. 28, the hand-held device 100 may include an antenna unit 108, a communication unit 110, a control unit 120, a memory unit 130, a power supply unit 140a, an interface unit 140b, and an input/output unit 140c. The antenna unit 108 may be configured as a part of the communication unit 110. Blocks 110 to 130/140a to 140c correspond to the blocks 110 to 130/140 in FIG. 27, respectively.

The communication unit 110 may transmit and receive a signal (e.g., data, a control signal, or the like) to and from other wireless devices and base stations. The control unit 120 may control various components of the hand-held device 100 to perform various operations. The control unit 120 may include an application processor (AP). The memory unit 130 may store data/parameter/program/code/command necessary to drive the hand-held device 100. Further, the memory unit 130 may store input/output data/information. The power supply unit 140a supplies power to the hand-held device 100 and may include a wired/wireless charging circuit, a battery, and the like. The interface unit 140b may support a connection between the hand-held device 100 and a different external device. The interface unit 140b may include various ports (e.g., an audio input/output port and a video input/output port) for connection to an external device. The input/output unit 140c may receive or output image information/signal, audio information/signal, data, and/or information input from a user. The input/output unit 140c may include a camera, a microphone, a user input unit, a display unit 140d, a speaker, and/or a haptic module.

For example, in data communication, the input/output unit 140c may obtain information/signal (e.g., a touch, text, voice, an image, and a video) input from the user, and the obtained information/signal may be stored in the memory unit 130. The communication unit 110 may convert information/signal stored in the memory unit into a radio signal and may transmit the converted radio signal directly to a different wireless device or to a base station. In addition, the communication unit 110 may receive a radio signal from a different wireless device or the base station and may reconstruct the received radio signal to original information/signal. The reconstructed information/signal may be stored in the memory unit 130 and may then be output in various forms (e.g., text, voice, an image, a video, and a haptic form) through the input/output unit 140c.

Figure 29:
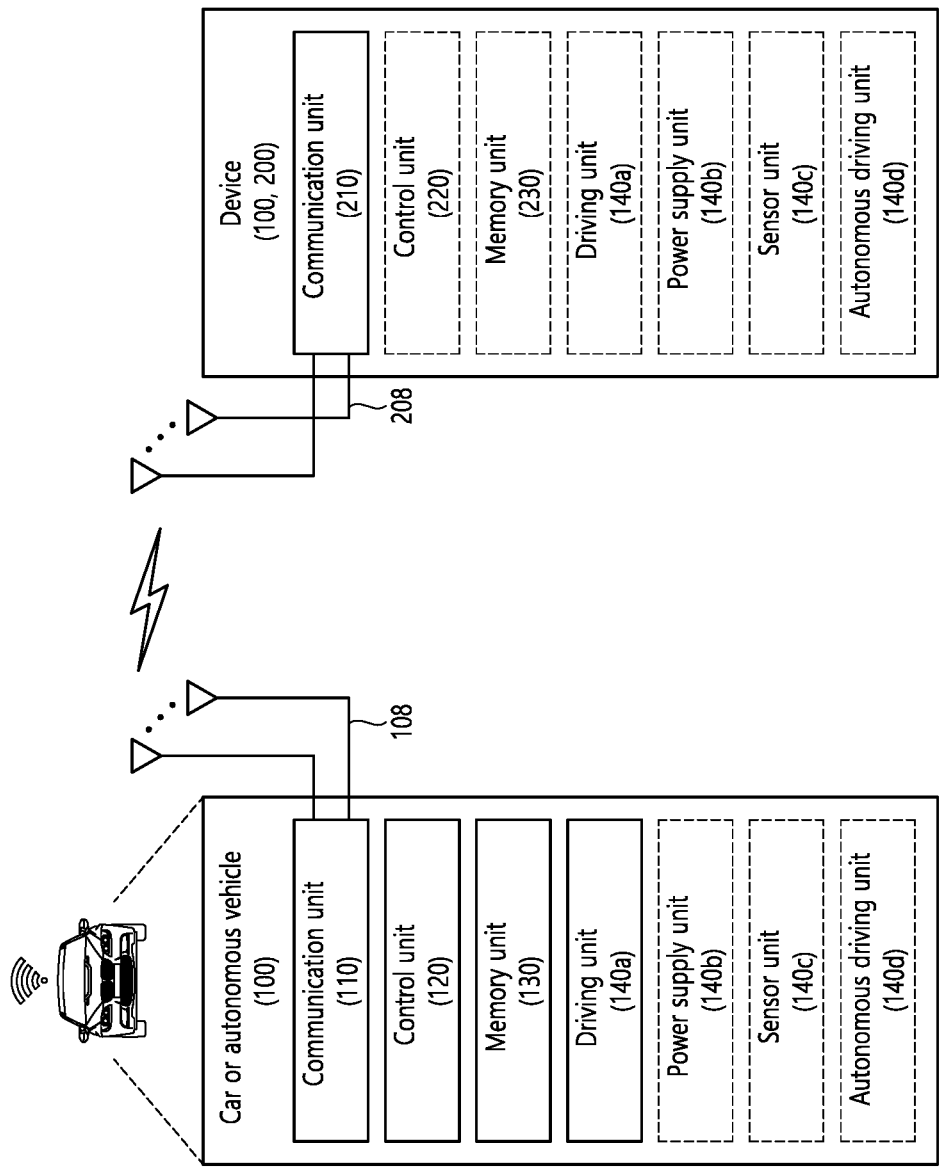
FIG. 29 illustrates a vehicle or an autonomous driving vehicle applied to the disclosure.

FIG. 29 illustrates a vehicle or an autonomous driving vehicle applied to the disclosure. The vehicle or the autonomous driving may be configured as a mobile robot, a car, a train, a manned/unmanned aerial vehicle (AV), a ship, or the like.

Referring to FIG. 29, the vehicle or the autonomous driving vehicle 100 may include an antenna unit 108, a communication unit 110, a control unit 120, a driving unit 140a, a power supply unit 140b, a sensor unit 140c, and an autonomous driving unit 140*d*. The antenna unit 108 may be configured as a part of the communication unit 110. Blocks 110/130/140*a* to 140*d* correspond to the blocks 110/130/140 in FIG. 27, respectively.

The communication unit 110 may transmit and receive a signal (e.g., data, a control signal, or the like) to and from external devices, such as a different vehicle, a base station (e.g. a base station, a road-side unit, or the like), and a server. The control unit 120 may control elements of the vehicle or the autonomous driving vehicle 100 to perform various operations. The control unit 120 may include an electronic control unit (ECU). The driving unit 140*a* may enable the vehicle or the autonomous driving vehicle 100 to run on the ground. The driving unit 140*a* may include an engine, a motor, a power train, wheels, a brake, a steering device, and the like. The power supply unit 140*b* supplies power to the vehicle or the autonomous driving vehicle 100 and may include a wired/wireless charging circuit, a battery, and the like. The sensor unit 140*c* may obtain a vehicle condition, environmental information, user information, and the like. The sensor unit 140*c* may include an inertial measurement unit (IMU) sensor, a collision sensor, a wheel sensor, a speed sensor, an inclination sensor, a weight sensor, a heading sensor, a position module, vehicular forward/backward vision sensors, a battery sensor, a fuel sensor, a tire sensor, a steering sensor, a temperature sensor, a humidity sensor, an ultrasonic sensor, an illuminance sensor, a pedal position sensor, and the like. The autonomous driving unit 140*d* may implement a technology for maintaining a driving lane, a technology for automatically adjusting speed, such as adaptive cruise control, a technology for automatic driving along a set route, a technology for automatically setting a route and driving when a destination is set, and the like.

For example, the communication unit 110 may receive map data, traffic condition data, and the like from an external server. The autonomous driving unit 140*d* may generate an autonomous driving route and a driving plan on the basis of obtained data. The control unit 120 may control the driving unit 140*a* to move the vehicle or the autonomous driving vehicle 100 along the autonomous driving route according to the driving plan (e.g., speed/direction control). During autonomous driving, the communication unit 110 may aperiodically/periodically obtain updated traffic condition data from the external server and may obtain surrounding traffic condition data from a neighboring vehicle. Further, during autonomous driving, the sensor unit 140*c* may obtain a vehicle condition and environmental information. The autonomous driving unit 140*d* may update the autonomous driving route and the driving plan on the basis of newly obtained data/information. The communication unit 110 may transmit information about a vehicle location, an autonomous driving route, a driving plan, and the like to the external server. The external server may predict traffic condition data in advance using AI technology or the like on the basis of information collected from vehicles or autonomous driving vehicles and may provide the predicted traffic condition data to the vehicles or the autonomous driving vehicles.

Figure 30:
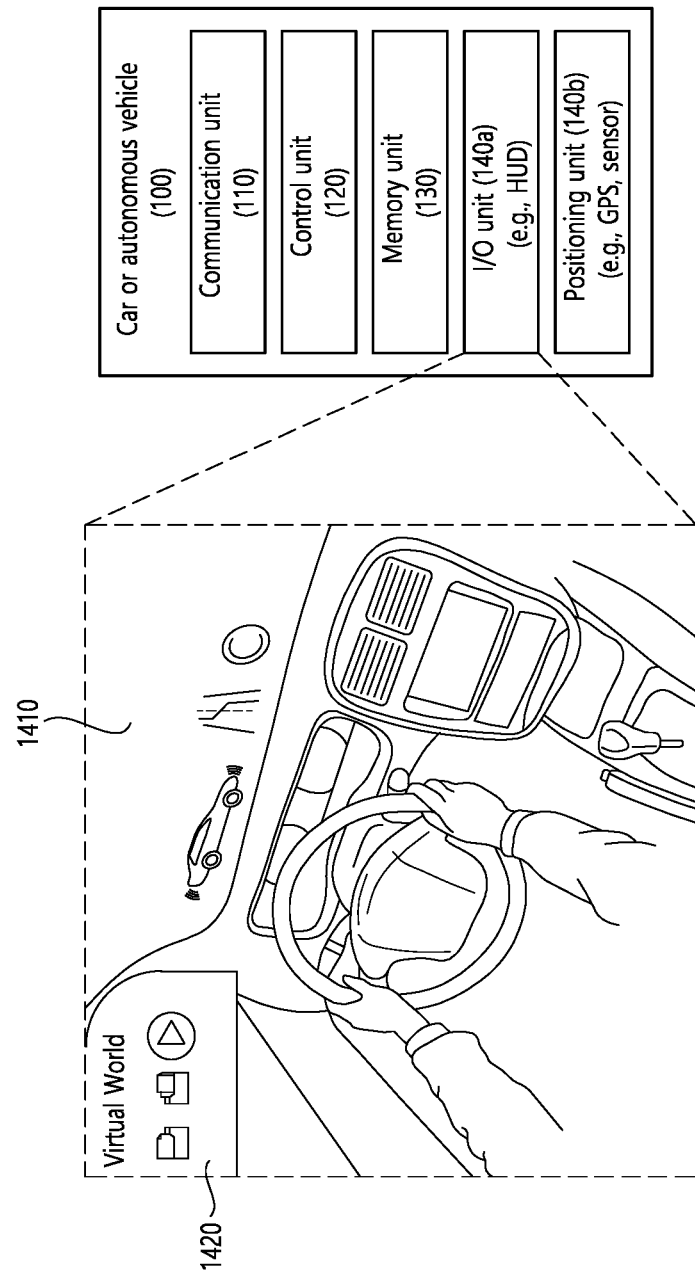
FIG. 30 illustrates a vehicle applied to the disclosure.

FIG. 30 illustrates a vehicle applied to the disclosure. The vehicle may be implemented as a means of transportation, a train, an air vehicle, a ship, and the like.

Referring to FIG. 30, the vehicle 100 may include a communication unit 110, a control unit 120, a memory unit 130, an input/output unit 140*a*, and a positioning unit 140*b*. Herein, blocks 110 to 130/140*a* to 140*b* correspond to block 110 to 130/140 of FIG. 27, respectively.

The communication unit 110 may transmit/receive signals (e.g., data, control signals, etc.) with other vehicles or external devices such as a base station. The control unit 120 may control components of the vehicle 100 to perform various operations. The memory unit 130 may store data/parameters/programs/codes/commands supporting various functions of the vehicle 100. The input/output unit 140*a* may output an AR/VR object based on information in the memory unit 130. The input/output unit 140*a* may include a HUD. The positioning unit 140*b* may acquire position information of the vehicle 100. The location information may include absolute location information of the vehicle 100, location information within a driving line, acceleration information, location information with a neighboring vehicle, and the like. The positioning unit 140*b* may include a GPS and various sensors.

For example, the communication unit 110 of the vehicle 100 may receive map information, traffic information, and the like from an external server and store it in the memory unit 130. The positioning unit 140*b* may obtain vehicle position information through GPS and various sensors and store it in the memory unit 130. The control unit 120 may generate a virtual object based on map information, traffic information, vehicle location information, and the like, and the input/output unit 140*a* may display the generated virtual object on a window inside the vehicle (1410 and 1420). In addition, the control unit 120 may determine whether the vehicle 100 is normally operating within the driving line based on the vehicle location information. When the vehicle 100 abnormally deviates from the driving line, the control unit 120 may display a warning on the windshield of the vehicle through the input/output unit 140*a*. Also, the control unit 120 may broadcast a warning message regarding the driving abnormality to surrounding vehicles through the communication unit 110. Depending on the situation, the control unit 120 may transmit the location information of the vehicle and information on driving/vehicle abnormality to the related organization through the communication unit 110.

Figure 31:
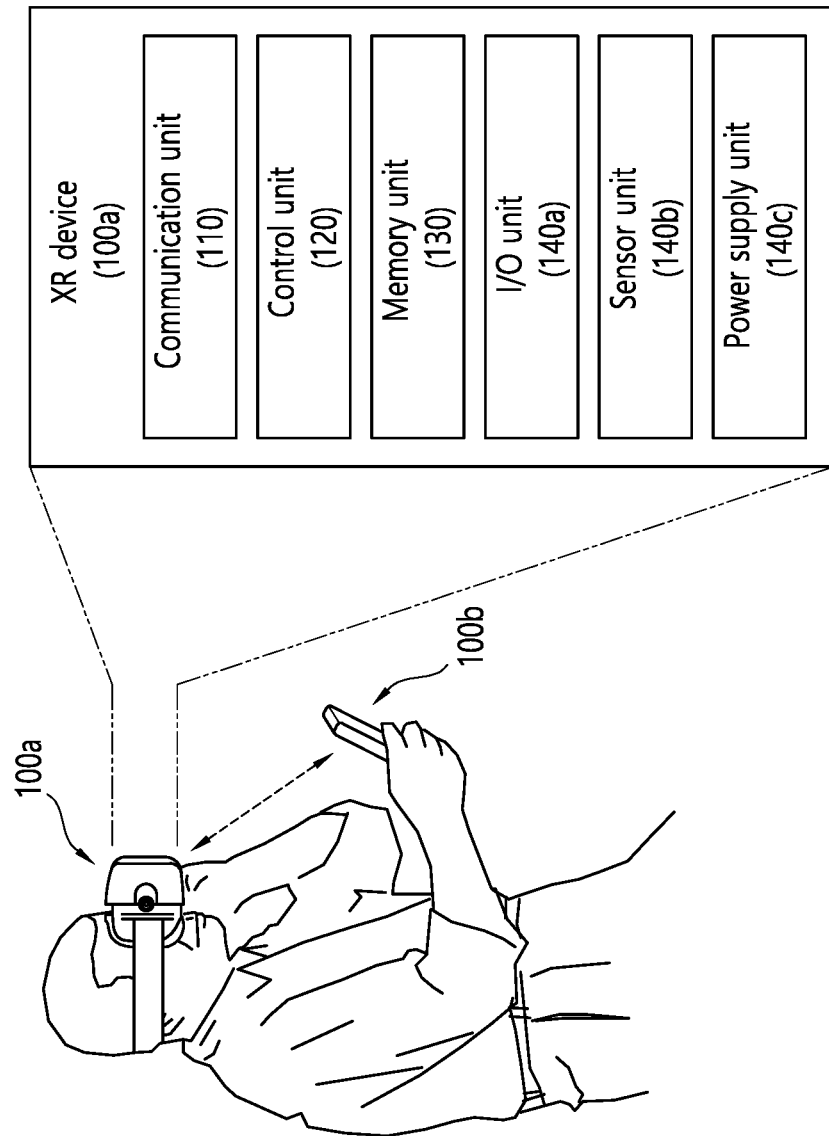
FIG. 31 illustrates a XR device applied to the disclosure.

FIG. 31 illustrates a XR device applied to the disclosure. The XR device may be implemented as an HMD, a head-up display (HUD) provided in a vehicle, a television, a smartphone, a computer, a wearable device, a home appliance, a digital signage, a vehicle, a robot, and the like.

Referring to FIG. 31, the XR device 100*a* may include a communication unit 110, a control unit 120, a memory unit 130, an input/output unit 140*a*, a sensor unit 140*b* and a power supply unit 140*c*. Herein, blocks 110 to 130/140*a* to 140*c* correspond to blocks 110 to 130/140 in FIG. 27.

The communication unit 110 may transmit/receive signals (e.g., media data, control signals, etc.) to/from external devices such as other wireless devices, portable devices, or media servers. Media data may include images, images, sounds, and the like. The control unit 120 may control the components of the XR device 100*a* to perform various operations. For example, the control unit 120 may be configured to control and/or perform procedures such as video/image acquisition, (video/image) encoding, and metadata generation and processing. The memory unit 130 may store data/parameters/programs/codes/commands necessary for driving the XR device 100*a*/creating an XR object. The input/output unit 140*a* may obtain control information, data, and the like from the outside, and may output the generated XR object. The input/output unit 140*a* may include a camera, a microphone, a user input unit, a display unit, a speaker, and/or a haptic module. The sensor unit 140*b* may obtain an XR device state, surrounding environment information, user information, and the like. The sensor unit 140b may include a proximity sensor, an illumination sensor, an acceleration sensor, a magnetic sensor, a gyro sensor, an inertial sensor, a RGB sensor, an IR sensor, a fingerprint recognition sensor, an ultrasonic sensor, an optical sensor, a microphone, and/or a radar. The power supply unit 140c supplies power to the XR device 100a, and may include a wired/wireless charging circuit, a battery, and the like.

For example, the memory unit 130 of the XR device 100a may include information (e.g., data, etc.) necessary for generating an XR object (e.g., AR/VR/MR object). The input/output unit 140a may obtain a command to operate the XR device 100a from the user, and the control unit 120 may drive the XR device 100a according to the user's driving command. For example, when the user wants to watch a movie or news through the XR device 100a, the control unit 120 transmits the content request information through the communication unit 130 to another device (e.g., the mobile device 100b) or can be sent to the media server. The communication unit 130 may download/stream contents such as movies and news from another device (e.g., the portable device 100b) or a media server to the memory unit 130. The control unit 120 controls and/or performs procedures such as video/image acquisition, (video/image) encoding, and metadata generation/processing for the content, and is acquired through the input/output unit 140a/the sensor unit 140b An XR object can be generated/output based on information about one surrounding space or a real object.

Also, the XR device 100a is wirelessly connected to the portable device 100b through the communication unit 110, and the operation of the XR device 100a may be controlled by the portable device 100b. For example, the portable device 100b may operate as a controller for the XR device 100a. To this end, the XR device 100a may obtain 3D location information of the portable device 100b, and then generate and output an XR object corresponding to the portable device 100b.

Figure 32:
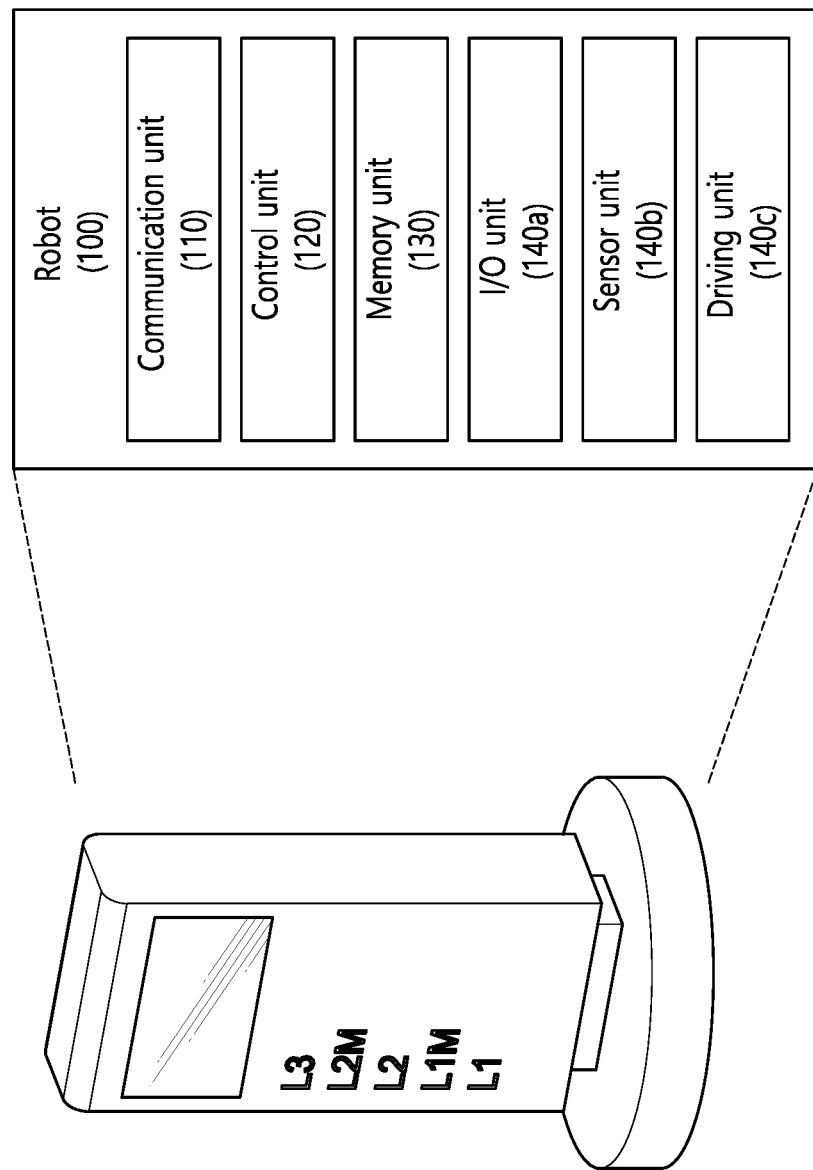
FIG. 32 illustrates a robot applied to the disclosure.

FIG. 32 illustrates a robot applied to the disclosure. The robot may be classified into industrial, medical, home, military, and the like depending on the purpose or field of use.

Referring to FIG. 32, the robot 100 may include a communication unit 110, a control unit 120, a memory unit 130, an input/output unit 140a, a sensor unit 140b, and a driving unit 140c. Herein, blocks 110 to 130/140a to 140c correspond to blocks 110 to 130/140 in FIG. 27.

The communication unit 110 may transmit/receive signals (e.g., driving information, control signal, etc.) to/from external device such as other wireless device, other robot, or a control server. The control unit 120 may perform various operations by controlling the components of the robot 100. The memory unit 130 may store data/parameters/programs/codes/commands supporting various functions of the robot 100. The input/output unit 140a may obtain information from the outside of the robot 100 and may output information to the outside of the robot 100. The input/output unit 140a may include a camera, a microphone, an user input unit, a display unit, a speaker, and/or a haptic module, etc. The sensor unit 140b may obtain internal information, surrounding environment information, user information and the like of the robot 100. The sensor unit may include a proximity sensor, an illumination sensor, an acceleration sensor, a magnetic sensor, a gyro sensor, an inertial sensor, an IR sensor, a fingerprint recognition sensor, an ultrasonic sensor, an optical sensor, a microphone, a radar, and the like. The driving unit 140c may perform various physical operations such as moving a robot joint. In addition, the driving unit 140c may make the robot 100 travel on the ground or fly in the air. The driving unit 140c may include an actuator, a motor, a wheel, a brake, a propeller, and the like.

Figure 33:
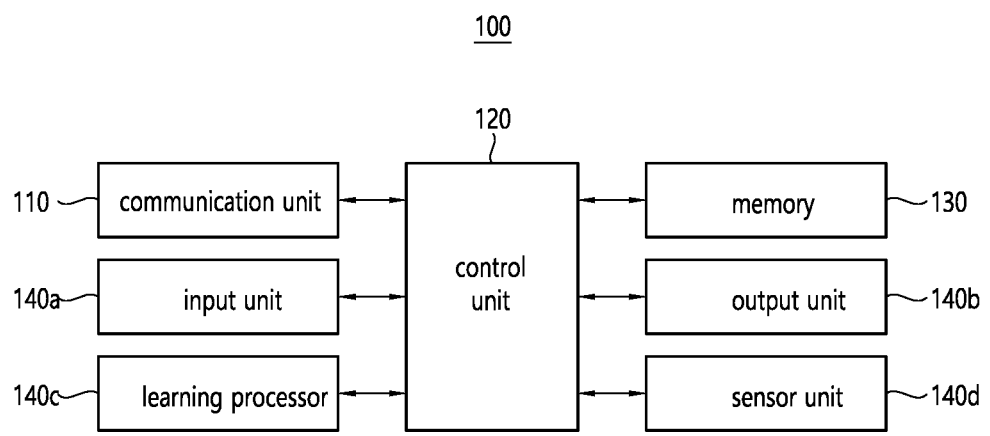
FIG. 33 illustrates an AI device applied to the disclosure.

FIG. 33 illustrates an AI device applied to the disclosure. The AI device may be implemented as a stationary device or a mobile device, such as a TV, a projector, a smartphone, a PC, a laptop, a digital broadcasting terminal, a tablet PC, a wearable device, a set-top box, a radio, a washing machine, a refrigerator, digital signage, a robot, and a vehicle.

Referring to FIG. 33, the AI device 100 may include a communication unit 110, a control unit 120, a memory unit 130, an input unit 140a, an output unit 140b, a learning processor unit 140c, and a sensor unit 140d. Blocks 110 to 130/140a to 140d correspond to the blocks 110 to 130/140 of FIG. 27, respectively.

The communication unit 110 may transmit and receive wired or wireless signals (e.g., sensor information, a user input, a learning mode, a control signal, or the like) to and from external devices, a different AI device (e.g., 100x, 200, or 400 in FIG. 24) or an AI server (e.g., 400 in FIG. 24) using wired or wireless communication technologies. To this end, the communication unit 110 may transmit information in the memory unit 130 to an external device or may transmit a signal received from the external device to the memory unit 130.

The control unit 120 may determine at least one executable operation of the AI device 100 on the basis of information determined or generated using a data analysis algorithm or a machine-learning algorithm. The control unit 120 may control components of the AI device 100 to perform the determined operation. For example, the control unit 120 may request, retrieve, receive, or utilize data of the learning processor unit 140c or the memory unit 130 and may control components of the AI device 100 to perform a predicted operation or an operation determined to be preferable among the at least one executable operation. The control unit 120 may collect history information including details about an operation of the AI device 100 or a user's feedback on the operation and may store the history information in the memory unit 130 or the learning processor unit 140c or may transmit the history information to an external device, such as the AI server (400 in FIG. 24). The collected history information may be used to update a learning model.

The memory unit 130 may store data for supporting various functions of the AI device 100. For example, the memory unit 130 may store data obtained from the input unit 140a, data obtained from the communication unit 110, output data from the learning processor unit 140c, and data obtained from the sensing unit 140. Further, the memory unit 130 may store control information and/or a software code necessary for the operation/execution of the control unit 120.

The input unit 140a may obtain various types of data from the outside of the AI device 100. For example, the input unit 140a may obtain learning data for model learning and input data to which a learning model is applied. The input unit 140a may include a camera, a microphone, and/or a user input unit. The output unit 140b may generate visual, auditory, or tactile output. The output unit 140b may include a display unit, a speaker, and/or a haptic module. The sensing unit 140 may obtain at least one of internal information about the AI device 100, environmental information about the AI device 100, and user information using various sensors. The sensing unit 140 may include a proximity sensor, an illuminance sensor, an acceleration sensor, a magnetic sensor, a gyro sensor, an inertial sensor, an RGB sensor, an IR sensor, a fingerprint sensor, an ultrasonic sensor, an optical sensor, a microphone, and/or a radar.

The learning processor unit 140c may train a model including artificial neural networks using learning data. The learning processor unit 140c may perform AI processing together with a learning processor unit of an AI server (400 in FIG. 24). The learning processor unit 140c may process information received from an external device through the communication unit 110 and/or information stored in the memory unit 130. In addition, an output value from the learning processor unit 140c may be transmitted to an external device through the communication unit 110 and/or may be stored in the memory unit 130.

What is claimed is:

1. A method, comprising:
receiving, by a user equipment (UE), configuration information for downlink control information (DCI) from a base station, wherein the configuration information for the DCI comprises size information and position information; and
receiving, by the UE, a DCI format for notifying power saving information for one or more user equipments (UEs) from the base station based on the size information and the position information,
wherein the DCI format includes a first field and a second field,
wherein the first field comprises wake-up indication for the UE, and the second field comprises a known bit stream for the UE,
wherein a starting position of the first field in the DCI format is determined based on the position information and a size of the DCI format is informed based on the size information,
wherein the known bit stream is informed to the UE by the configuration information for the DCI, and
wherein based on that the DCI format is detected in a default bandwidth part (BWP), a BWP inactivity timer of the UE is reset.

2. The method of claim 1, wherein the UE performs decoding on the DCI format based on the known bit stream.

3. The method of claim 1, wherein the known bit stream is a predefined bit stream.

4. The method of claim 1, wherein the DCI format informs the UE of a power saving scheme configured to the UE.

5. The method of claim 4, wherein the UE performs an operation related to the power saving scheme based on the DCI format.

6. The method of claim 1, wherein a first transmission configuration indication (TCI) of a control resource set (CORESET) for monitoring the DCI format is as same as a second TCI of a CORESET for monitoring a physical downlink control channel (PDCCH).

7. The method of claim 1, wherein a bandwidth part (BWP) for monitoring the DCI format is an active BWP at a time of monitoring the DCI for the UE.

8. The method of claim 1, wherein a CORESET for monitoring the DCI format is included in a CORESET for monitoring a PDCCH configured to the UE.

9. The method of claim 1, wherein a CORESET for monitoring the DCI format is configured independently to the UE of a CORESET for monitoring a PDCCH configured to the UE.

10. The method of claim 1, wherein based on that both discontinuous reception (DRX) operation and monitoring for the DCI format are configured to the UE, the UE receives a measurement report configuration in a time duration other than an active time from the base station.

11. The method of claim 10, wherein based on the measurement report configuration, the UE transmits measurement report information to the base station in the time duration.

12. The method of claim 10, wherein the UE transmits stop request information for at least one of the monitoring for the DCI format and the DRX operation to the base station.

13. The method of claim 1, wherein the default BWP is a BWP to be moved from an active BWP based on a BWP inactivity timer of the active BWP expiring.

14. A user equipment (UE), comprising:
at least one memory;
at least one transceiver; and
at least one processor operably connectable to the at least one memory and the at least one transceiver,
wherein the at least one memory stores instructions that, based on being executed by the at least one processor, cause the at least one processor to perform operations comprising:
receiving, by a user equipment (UE), configuration information for downlink control information (DCI) from a base station, wherein the configuration information for the DCI comprises size information and position information; and
receiving, by the UE, a DCI format for notifying power saving information for one or more user equipments (UEs) from the base station based on the size information and the position information,
wherein the DCI format includes a first field and a second field,
wherein the first field comprises wake-up indication for the UE, and the second field comprises a known bit stream for the UE,
wherein a starting position of the first field in the DCI format is determined based on the position information and a size of the DCI format is informed based on the size information,
wherein the known bit stream is informed to the UE by the configuration information for the DCI, and
wherein based on that the DCI format is detected in a default bandwidth part (BWP), a BWP inactivity timer of the UE is reset.

15. An apparatus, comprising:
at least one processor; and
at least one memory operably connectable to the at least one processor,
wherein the at least one memory stores instructions that, based on being executed by the at least one processor, cause the at least one processor to perform operations comprising:
receiving configuration information for downlink control information (DCI) from a base station, wherein the configuration information for the DCI comprises size information and position information; and
receiving a DCI format for notifying power saving information for one or more user equipments (UEs) from the base station based on the size information and the position information,
wherein the DCI format includes a first field and a second field,
wherein the first field comprises wake-up indication for the UE, and the second field comprises a known bit stream for the UE, wherein a starting position of the first field in the DCI format is determined based on the position information and a size of the DCI format is informed based on the size information, wherein the known bit stream is informed to the UE by the configuration information for the DCI, and wherein based on that the DCI format is detected in a default bandwidth part (BWP), a BWP inactivity timer of the UE is reset.

* * * * *